United States Patent
Hakeem et al.

(10) Patent No.: US 11,479,463 B2
(45) Date of Patent: Oct. 25, 2022

(54) METHOD OF FORMING A βSIALON BY SPARK PLASMA SINTERING

(71) Applicant: KING FAHD UNIVERSITY OF PETROLEUM AND MINERALS, Dhahran (SA)

(72) Inventors: Abbas Saeed Hakeem, Dhahran (SA); Anwar Ul-Hamid, Dhahran (SA); Oki Muraza, Dhahran (SA); Muhammad Ali Ehsan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 413 days.

(21) Appl. No.: 16/530,369

(22) Filed: Aug. 2, 2019

(65) Prior Publication Data

US 2021/0032105 A1    Feb. 4, 2021

(51) Int. Cl.
| | |
|---|---|
| *C01B 21/082* | (2006.01) |
| *C04B 35/597* | (2006.01) |
| *C04B 35/64* | (2006.01) |
| *C04B 35/645* | (2006.01) |

(52) U.S. Cl.
CPC ........ *C01B 21/0826* (2013.01); *C04B 35/597* (2013.01); *C04B 35/64* (2013.01); *C04B 35/645* (2013.01); *C01P 2002/72* (2013.01); *C01P 2004/03* (2013.01); *C01P 2004/04* (2013.01); *C01P 2004/64* (2013.01); *C01P 2006/10* (2013.01); *C01P 2006/32* (2013.01); *C01P 2006/80* (2013.01)

(58) Field of Classification Search
None
See application file for complete search history.

(56) References Cited

U.S. PATENT DOCUMENTS

| | | | |
|---|---|---|---|
| 4,438,051 A | * | 3/1984 | Mitomo ............ C04B 35/597 264/1.21 |
| 8,926,864 B2 | | 1/2015 | Ichikawa et al. |
| | | | (Continued) |

FOREIGN PATENT DOCUMENTS

| | | |
|---|---|---|
| CN | 102115332 B | 4/2013 |
| CN | 109336614 A | 2/2019 |
| JP | 2001-261447 A | 9/2001 |
| JP | 2008-297161 A | 12/2008 |

OTHER PUBLICATIONS

Gauckler et al. (Contribution to the Phase Diagram Si3N4—AlN—Al2O3—SiO2, J Am Cer Soc—Disc and Notes, vol. 58, Issue 7-8 (1975), pp. 346-347) (Year: 1975).*

(Continued)

*Primary Examiner* — Colin W. Slifka
*Assistant Examiner* — Michael Forrest
(74) *Attorney, Agent, or Firm* — Oblon, McClelland, Maier & Neustadt, L.L.P.

(57) ABSTRACT

A method of making a β-SiAlON is described in involves mixing nanoparticles of AlN, $Al_2O_3$, and $SiO_2$ with particles of $Si_3N_4$ and spark plasma sintering the mixture. The sintering may be at a temperature of 1450-1600° C. or about 1500° C. The particles of $Si_3N_4$ may be nanoparticles comprising amorphous $Si_3N_4$, or 25-55 μm diameter microparticles comprising β-$Si_3N_4$.

20 Claims, 35 Drawing Sheets

(56) References Cited

U.S. PATENT DOCUMENTS

| 9,764,988 | B1 | 9/2017 | Hakeem et al. | |
|---|---|---|---|---|
| 2007/0184569 | A1* | 8/2007 | Okawa | C04B 35/62695 |
| | | | | 438/46 |
| 2018/0155250 | A1* | 6/2018 | Hakeem | C04B 35/62615 |

OTHER PUBLICATIONS

Pengli Dong, et al., "The Preparation and Characterization of β-SiAlON Nanostructure Whiskers", Journal of Nanomaterials, 2008, Article ID: 282167, 6 pages (Abstract only).

Mikinori Hotta, et al., "Preparation of βSiAlON-cBN Composites by Spark Plasma Sintering", Key Engineering Materials, vol. 403, 2009, pp. 241-242 (Abstract only).

Khan Ali Nekouee, et al., "Synthesis and properties evaluation of β-SiAlON prepared by mechanical alloying followed by different sintering technique", International Journal of Materials Research (Formerly Zeitschrift Fuer Metallkunde), vol. 107, Nov. 2016, pp. 1-7.

Xin Xu, et al., "Fabrication of β-sialon nanoceramics by high-energy mechanical milling and spark plasma sintering", Institute of Physics Publishing, Nanotechnology, vol. 16, Jul. 2005, pp. 1569-1573.

I Zalite, et al., "Spark plasma sintering of SiAlON nanopowders", 5th Baltic Conference on Silicate Materials, IOP Conference Series: Materials Science and Engineering, vol. 25, 2011, pp. 1-6.

Friedrich Ivo Bulić, et al., "Comparison of plasma-chemical synthesised SiAlON nano-powder and conventional prepared SiAlON powder", Journal of the European Ceramic Society, vol. 24, Issue 12, 2004, pp. 3303-3306 (Abstract only).

\* cited by examiner

- β-SiAlON (Si$_3$AlON$_7$, ICDD: 01-048-1615)
- β-SiAlON (Si$_4$Al$_2$O$_2$N$_6$, ICDD: 00-048-1616)
- β'-SiAlON (Si$_3$Al$_3$O$_3$N$_5$, ICDD: 00-036-1333)
- β'-SiAlON (Si$_5$AlON$_7$, ICDD: 00-048-1615)
- AlN Polytype (Si$_{1.62}$Al$_{0.38}$N$_{1.62}$O$_{1.38}$, ICDD: 01-088-2059)
- AlN Polytype (Si$_{1.84}$Al$_{0.16}$N$_{1.84}$O$_{1.16}$, ICDD: 01-088-2058)
- AlN Polytype (Si$_3$Al$_6$N$_{12}$O$_2$, ICDD: 00-042-0165)
- Quartz Low (SiO$_2$, ICDD: 01-070-2538)

METHOD OF FORMING A βSIALON BY SPARK PLASMA SINTERING

STATEMENT OF ACKNOWLEDGEMENT

This project was prepared with financial support from King Abdulaziz City for Science and Technology (KACST) through the Science & Technology Unit at King Fahd University of Petroleum & Minerals (KFUPM): Project no. 12-ADV2411-04 as part of the National Science, Technology and Innovation Plan.

BACKGROUND OF THE INVENTION

Technical Field

The present invention relates to a method of forming a β-SiAlON by spark plasma sintering a precursor powder mixture.

Description of the Related Art

The "background" description provided herein is for the purpose of generally presenting the context of the disclosure. Work of the presently named inventors, to the extent it is described in this background section, as well as aspects of the description which may not otherwise qualify as prior art at the lime of filing, are neither expressly or impliedly admitted as prior art against the present invention.

Ceramic materials have been widely used as tools under harsh conditions, such as those during cutting and machining, due to their advantageous properties such as high hardness, high fracture toughness, and good wear resistance In addition to these properties, ceramic materials typically exhibit excellent chemical inertness, stability, thermal resistance, and oxidation resistance at high temperatures. See J. F. Collins and R. W. Gerby, "New Refractory Uses For Silicon Nitride Reported." *JOM*. vol. 7, no. 5, pp. 612-615, May 1955; G. R. Terwilliger, "Properties of Sintered $Si_3N_4$," *J. Am. Ceram. Soc.*, vol. 57, no. 1, pp. 48-49, January 1974; B. Bitterlich, S. Bitsch, and K. Friederich, "SiAlON based ceramic cutting tools," *J. Eur. Ceram. Soc.*, vol. 28, no. 5, pp. 989-994, January 2008; and A. K. Mallik. N. C. Acikbas, F. Kara, H. Mandal, and D. Basu, "A comparative study of SiAlON ceramics," *Ceram. Int.*, vol. 38, no. 7, pp. 5757-5767, September 2012.

Among ceramic materials, Sialon ceramics have been widely studied because of their superior mechanical properties, chemical/thermal stability, and high-temperature hardness. See B. Bitterlich, S. Bitsch, and K. Friederich, "SiAlON based ceramic cutting tools," *J. Eur. Ceram. Soc.*, vol. 28, no. 5, pp. 989-994, January 2008; A. K. Mallik, N. C. Acikbas, F. Kara, H. Mandal, and D. Basu, "A comparative study of SiAlON ceramics," *Ceram. Int.*, vol. 38, no. 7, pp. 5757-5767, September 2012; T. Ekström and M. Nygren, "SiAlON ceramics," *J. Am. Ceram.*, 1992; K. H. JACK and W. I. WILSON, "Ceramics based on the Si—Al—O—N and Related Systems," *Nature*, Publ. online 10 Jul. 1972; doi: 10.1038/10.1038/physci238028a0, vol. 238, no. 80, p. 28, July 1972; S. Bošković and K. G. Nickel, "Preparation and Properties of α/β SiAlON Composites," in *Science of Sintering*, Boston, Mass.: Springer US, 1989, pp. 621-629; and N. C. Acikbas, S. Tegmen, S. Ozcan, and G. Acikbas, "Thermal shock behaviour of α:β-SiAlON—TiN composites," *Ceram. Int.*, vol. 40, no. 2, pp. 3611-3618, March 2014.

However, the microstructure and mechanical properties of Sialon materials are strongly influenced by their composition, starting powder ratios, particle size, and processing parameters (e.g., pressure, heating rate, holding temperature and holding time) because of the evolution of different phases and the stability of these phases. See R. M. A. Khan, M. M. Al-Malki, and A. S. Hakeem, "Development of a single-phase Ca-α-SiAlON ceramic from nanosized precursors using spark plasma sintering," *Mater. Sci. Eng. A*, vol. 673, pp. 243-249, September 2016; I. -W. Chen, R. Shuba, and M. Zenotchkine, "Development of Tough Alpha-SiAlON," *Dep. Pap.*, January 2003; and A. S. Hakeem, R. M. A. Khan, M. M. Al-Malki, F. Patel, A. I. Bakare, S. Ali, S. Hampshire, and T. Laoui, "Development and Processing of SiAlON Nano-Ceramics by Spark Plasma Sintering," *Adv. Sci. Technol.*, vol. 89, pp. 63-69, October 2014. In particular, the characteristics of $Si_3N_4$ powder, such as its particle size, shape, and surface area, play a critical role in determining the evolution of the final microstructures and the properties of the synthesized materials. See I. -W. Chen, R. Shuba, and M. Zenotchkine, "Development of Tough Alpha-SiAlON," *Dep. Pap.*, January 2003; A. S. Hakeem, R. M. A. Khan, M. M. Al-Malki, F. Patel, A. I. Bakare, S. Ali, S. Hampshire, and T. Laoui, "Development and Processing of SiAlON Nano-Ceramics by Spark Plasma Sintering," *Adv. Sci. Technol.*, vol. 89, pp. 63-69, October 2014; N. C. Acikbas, R. Kumar, F. Kara, H. Mandal, and B. Basu, "Influence of β-$Si_3N_4$ particle size and heat treatment on microstructural evolution of α:β-SiAlON ceramics," *J. Eur. Ceram. Soc.*, vol. 31, no. 4, pp. 629-635, April 2011; H. Mandal, N. C. Acikbas, G. Petzow, T. Nishimura, F. Saito, and J. T. Ma, "Processing, Characterization and Mechanical Properties of SiAlONs Produced from Low Cost β-Si3N4 Powder," *KONA Powder Part. J.*, vol. 30, no. 0, pp. 22-30, 2013; N. C. Acikbas, F. Kara, and H. Mandal, "Development of α-β SiAlON Ceramics from Different Si3N4 Starting Powders," *Key Eng. Mater.*, vol. 403, pp. 107-108, 2009; and Y. -W. Li, P. -L. Wang, W. -W. Chen, Y. -B. Cheng, and D. -S. Yan, "Phase formation and microstructural evolution of Ca α-sialon using different Si3N4 starting powders," *J. Eur. Ceram. Soc.*, vol. 20, no. 11, pp. 1803-1808, October 2000.

Sialon is a ceramic comprising the elements silicon, aluminium, oxygen, and nitrogen. It can be fabricated by the addition of precursors such as alumina ($Al_2O_3$), silica ($SiO_2$), aluminium nitride (AlN), and silicon nitride ($Si_3N_4$). Due to the presence of covalent bonds between Si and N atoms, complete densification of the $Si_3N_4$ cannot be easily achieved. Conventional methods used to prepate sialon, such as hot pressing (HP), pressureless synthesis (PLS) and hot isostatic pressing (HIP), rely on very high temperatures. See S. Hampshire, "Silicon nitride ceramics," *Mater. Sci. Forum*, 2009; and A. S. Hakeem, R. Daucé, E. Leonova, M. Edén, Z. Shen, J. Grins, and S. Esmaeilzadeh, "Silicate Glasses with Unprecedented High Nitrogen and Electropositive Metal Contents Obtained by Using Metals as Precursors," *Adv. Mater.*, vol. 17, no. 18, pp. 2214-2216, September 2005.

The high temperatures required can be lowered by the addition of other precursors to the $Si_3N_4$ powder to achieve a better-densified product. During synthesis, Si and N atoms of $Si_3N_4$ are partially replaced by the Al and O atoms from the alumina to form Sialon as a solid solution of silicon nitride. To satisfy the valency requirements, the chemical replacement is one of exchanging Si—N bonds for Al—O bonds. The difference between the respective bond lengths (0.174 nm for Si—N and 0.175 nm for Al—O) is small; hence, the lattice strain is also small and the extent of the replacement can be large. See Ekström, T. et al. "Sialon Ceramics," *J. Am. Ceram. Soc* 75 (1992) 259-76. Although the bond lengths are approximately the same, the Al—O bond strength is substantially greater than that of Si—N. Additionally, $Si_3N_4$ exists in two basic polymorphs: α-Sialon and β-Sialon, which are isostructural with α-$Si_3N_4$ and β-$Si_3N_4$, respectively. The general formula of α-Sialon is $M_xSi_{12-(m+n)}Al_{(m+n)}O_nN_{16-n}$, where m represents the number of Al—N bonds and n represents the number of Al—O bonds, which are produced by replacing the Si—N bonds in α-$Si_3N_4$. See Y. Xiong, Z. Y. Fu, H. Wang, Y. C. Wang, J. Y. Zhang, and Q. J. Zhang, "Microstructure and properties of translucent Mg-sialon ceramics prepared by spark plasma sintering," *Mater. Sci. Eng. A*, vol. 488, no. 1-2, pp. 475-481, August 2008.

The general formula of β-Sialon is $Si_{6-z}Al_zO_zN_{8-z}$, where 0<Z<4. In β-Sialon, the Al—O bond strength is 50% greater than that in $Al_2O_3$. Thus, Sialons intrinsically have better properties than both $Si_3N_4$ and $Al_2O_3$. See "Sialon Ceramics Guide, Advanced Silicon Nitride Ceramics, International Syalons (Newcastle) Ltd." [Online]. Available: http://www.syalons.com/resources/advanced-ceramic-articles-and-guides/guide-to-types-of-sialon-ceramics/. The α-Sialon phase is harder than the β-Sialon phase; however, the latter phase is known to exhibit greater fracture toughness. See V. Izhevskiy, L. Genova, and J. Bressiani, "Progress in SiAlON ceramics," *J. Eur. Ceram. Soc* 20 (2000) 2275-95. The greater hardness of α-Sialon (~22 GPa) compared with that of β-Sialon is attributed to the longer stacking sequence (ABCD) in the α-$Si_3N_4$ crystal structure compared with that (AB) in the β-$Si_3N_4$ structure. β-Sialon is thermally more stable than α-Sialon. See Y. Xiong, Z. Y. Fu, H. Wang, Y. C. Wang, J. Y. Zhang, and Q. J. Zhang, "Microstructure and properties of translucent Mg-sialon ceramics prepared by spark plasma sintering," *Mater. Sci. Eng. A*, vol. 488, no. 1-2, pp. 475-481, August 2008. The resulting "solid solution" (Sialon) has properties superior to those of pure silicon nitride. As $Si_3N_4$ based ceramics, Sialon ceramics have numerous advantages over $Si_3N_4$ ceramics, such as better high-temperature properties and higher hardness because of the smaller amount of intergranular glassy phase, which is important for the synthesis and densification of $Si_3N_4$-based ceramics. See Ekström, T. et al. "Sialon Ceramics." *J. Am. Ceram. Soc* 75 (1992) 259-76; Y. Xiong, Z. Y. Fu, H. Wang, Y. C. Wang, J. Y. Zhang, and Q. J. Zhang, "Microstructure and properties of translucent Mg-sialon ceramics prepared by spark plasma sintering," *Mater. Sci. Eng. A*, vol. 488, no. 1-2, pp. 475-481, August 2008; and Sialon Ceramics Guide, Advanced Silicon Nitride Ceramics, International Syalons (Newcastle) Ltd."

The properties of Sialon materials are governed by their phase composition and morphology. Generally, the specific phase composition and morphology are controlled by the starting powder ratios and properties, and by the processing parameters. Ye et al. synthesized β-Sialon (Z=1) at 1550° C. with an applied pressure of 50 MPa by the SPS technique. See Y. Xiong, Z. Y. Fu, H. Wang, Y. C. Wang, J. Y. Zhang, and Q. J. Zhang, "Microstructure and properties of translucent Mg-sialon ceramics prepared by spark plasma sintering," *Mater. Sci. Eng. A*, vol. 488, no. 1-2, pp. 475-481, August 2008. They achieved a hardness of 14 GPa and fracture toughness of 4 MPa·m$^{1/2}$ without the addition of any reinforcement. Xuemei Yi et al. reported the highest Vickers hardness of 17.6 GPa for pure β-Sialon synthesized via SPS of combustion-synthesized powder at 1600° C. under 50 MPa pressure. See X. Yi, K. Watanabe, and T. Akiyama, "Preparation of β-$Si_{6-z}Al_zO_zN_{8-z}$ (z=1–3) by combustion synthesis," *IOP Conf. Ser. Mater. Sci. Eng.*, vol. 18, no. 7, p. 072004, May 2011. Spark plasma sintering (SPS) is a technique that enables the rapid and effective synthesis of ceramic powders at relatively low temperatures. See M. M. Al-Malki, R. M. A. Khan, and A. S. Hakeem, "Effect of Al metal precursor on the phase formation and mechanical properties of fine-grained SiAlON ceramics prepared by spark plasma sintering," *J. Eur. Ceram. Soc.*, vol. 37, no. 5, pp. 1975-1983, May 2017. It has been proven to be an economical technique that easily achieves belter densification of materials within a short holding time due to the possibility of attaining a higher heating rate. SPS has been used to prepare a wide range of ceramic, metallic, and composite materials. See A. S. Hakeem, J. Grins, and S. Esmaeilzadeh, "La—Si—O—N glasses: Part I. Extension of the glass forming region," *J. Eur. Ceram. Soc.*, vol. 27, no. 16, pp. 4773-4781, January 2007; X. Yi, K. Watanabe, and T. Akiyama, "Preparation of β-$Si_{6-z}Al_zO_zN_{8-z}$ (z=1–3) by combustion synthesis," *IOP Conf. Ser. Mater. Sci. Eng.*, vol. 18, no. 7, p. 072004, May 2011; and M. M. Al-Malki, R. M. A. Khan, and A. S. Hakeem, "Effect of Al metal precursor on the phase formation and mechanical properties of fine-grained SiAlON ceramics prepared by spark plasma sintering," *J. Eur. Ceram. Soc.*, vol. 37, no. 5, pp. 1975-1983, May 2017.

In view of the forgoing, one objective of the present invention is to develop a range of β-Sialon (1<Z<3) ceramics at a low synthesis temperature. The starting materials can be chosen from different sizes of silicon nitride ($Si_3N_4$): e.g., β-$Si_3N_4$ powder (particle size ~44 μm) and amorphous $Si_3N_4$ powder (particle size in the range 20-40 nm). Materials can be synthesized at various temperatures (1400° C., 1500° C., 1600° C., and 1700° C.) with the aid of the SPS technique. Additionally, the effect of the size of the amorphous and β-phase $Si_3N_4$ precursors on the evolution of the phase formation and, hence, on the physical, mechanical, and thermal properties of the Sialon was studied.

BRIEF SUMMARY OF THE INVENTION

According to a first aspect, the present disclosure relates to a method of making a β-SiAlON. The method involves mixing nanoparticles of AlN, $Al_2O_3$, and $SiO_2$ with particles of $Si_3N_4$ to form a powder mixture and spark plasma sintering the powder mixture at a temperature of 1450-1600° C. and a pressure of 40-60 MPa to form the β-SiAlON. The $Si_3N_4$ is present in the powder mixture at a weight percentage of 40-85 wt %, relative to a total weight of the powder mixture and is in the form of particles having an average diameter in a range of 15 nm-60 μm.

In one embodiment, the powder mixture is ultrasonicated in an organic solvent and dried before the spark plasma sintering.

In one embodiment, the spark plasma sintering is at a temperature in a range of 1480-1520° C.

In one embodiment, the spark plasma sintering uses a heating rate in a range of 80-120° C./min.

In one embodiment, the powder mixture is spark plasma sintered for a time in a range of 15-45 min.

In one embodiment, the β-SiAlON is substantially free of Ca.

In a further embodiment, the β-SiAlON consists essentially of Si, Al, O, and N.

In one embodiment, the $SiO_2$ nanoparticles have an average diameter in a range of 10-30 nm.

In one embodiment, the β-SiAlON has a thermal expansion coefficient in a range of 2.20-2.45 ppm/K.

In one embodiment, the particles of $Si_3N_4$ are nanoparticles of amorphous $Si_3N_4$ having an average diameter in a range of 15-100 nm.

In a further embodiment, the particles of $Si_3N_4$ are nanoparticles of amorphous $Si_3N_4$ having an average diameter in a range of 20-40 nm.

In a further embodiment, the $Si_3N_4$ is present in the powder mixture at a weight percentage of 65-85 wt %, relative to a total weight of the powder mixture.

In a further embodiment, the β-SiAlON has the formula $Si_5AlON_7$.

In a further embodiment, the β-SiAlON has a Vickers Hardness ($HV_{10}$) in a range of 18-25 GPa.

In a further embodiment, the β-SiAlON has a density in a range of 2.80-2.95 g/cm³.

In one embodiment, the particles of $Si_3N_4$ are microparticles of β-$Si_3N_4$ having an average diameter in a range of 25-55 μm.

In one embodiment, the particles of $Si_3N_4$ are present in the powder mixture at a weight percentage of 40-65 wt %, relative to a total weight of the powder mixture.

In a further embodiment, the β-SiAlON has the formula $Si_3Al_3O_3N_5$.

In a further embodiment, the β-SiAlON has a fracture toughness in a range of 7.0-10.0 MPa·m$^{1/2}$.

In a further embodiment, the β-SiAlON has a density in a range of 3.20-3.30 g/cm³.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
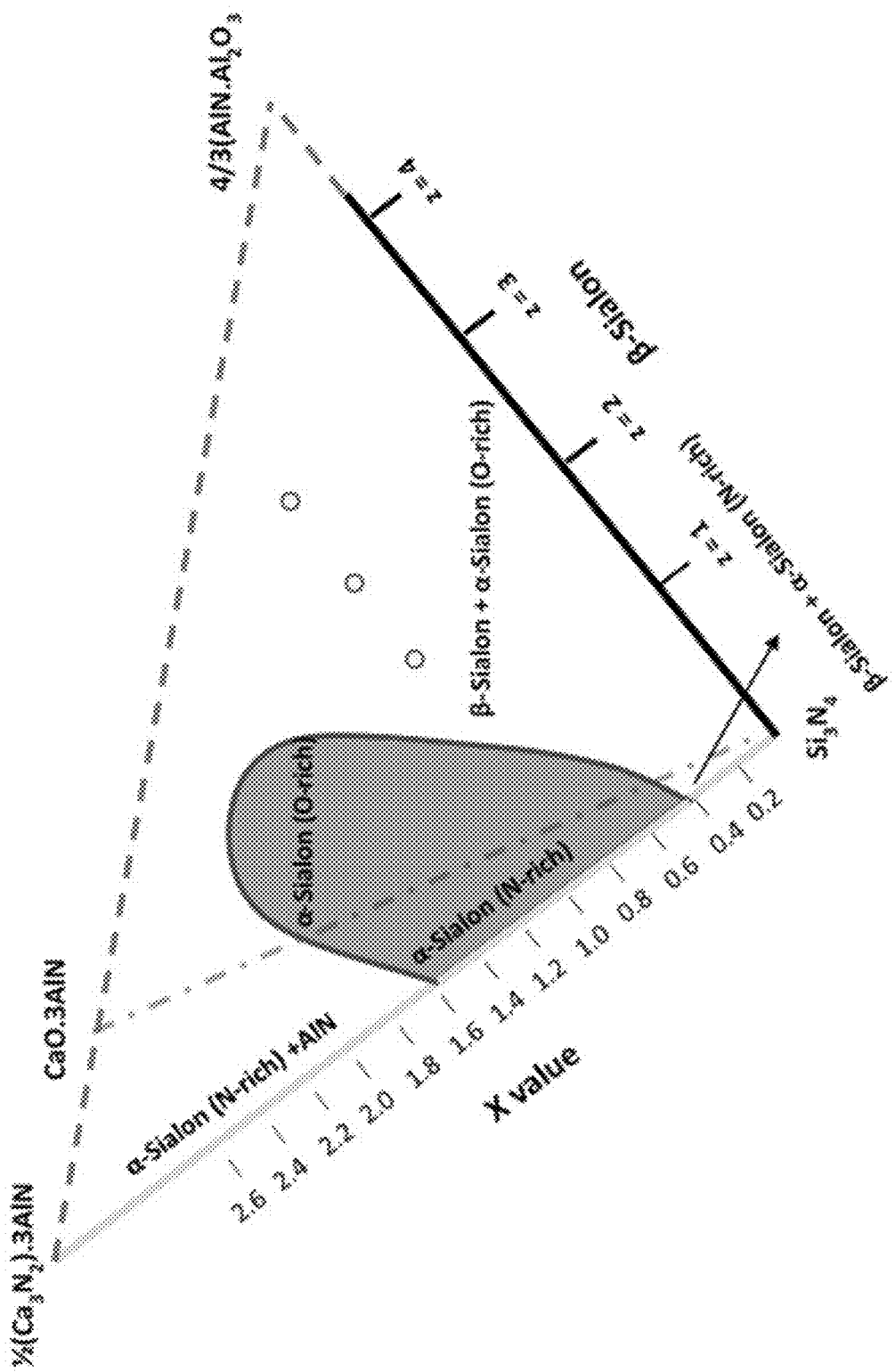
FIG. 1 is a schematic of the α-plane in Ca-Sialon system highlighting the compositions selected for the synthesis at the three centrally-located circles.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and or position to indicate that the value and/or position described is within a reasonable expected range of values and/or positions. For example, a numeric value may have a value that is +/−0.1% of the stated value (or range of values), +/−1% of the slated value (or range of values), +/−2% of the stated value (or range of values), +/−5% of the slated value (or range of values), +/−10% of the staled value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2.6H_2O$, and any other hydrated forms or mixtures. $CuCl_2$ includes both anhydrous $CuCl_2$ and $CuCl_2.2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of silicon include $^{28}Si$, $^{29}Si$, and $^{30}Si$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As defined here, a ceramic or a ceramic material is an inorganic, oxide, nitride, or carbide material. Ceramics are typically crystalline and non-metallic. Some elements, such as carbon or silicon, may be considered ceramics. However, some ceramics may contain metal ions, such as $Ca^{2+}$, interspersed within its structure. Ceramic materials are generally resistive against compression, but yield somewhat to shearing, fracturing, and tension, as compared to metals and metal alloys. Ceramics can typically withstand chemical erosion that occurs in other materials subjected to acidic or caustic environments. Ceramics generally can withstand very high temperatures without degrading, such as temperatures that range from 1,000° C. to 1,600° C. Glass is not considered a ceramic because of its amorphous (noncrystalline) character. A "ceramic composite," or "ceramic matrix composite," refers to a composite where at least one of the constituent materials is a ceramic. Furthermore, "ceramic composite," is considered synonymous with "composite ceramic."

Sialons are ceramics based on their component elements silicon (Si), aluminum (Al), oxygen (O) and nitrogen (N), and also may be denoted as "SiAlON" or "SiAlONs." As ceramics, sialon materials comprise a solid solution of silicon nitride and alumina, and may be classified into multiple phases based on different empirical formula, crystal structures, microstructure, and thermo-mechanical properties. The most common phases are α-sialon ("alpha-sialon") and β-sialon ("beta-sialon"), however, other phases may be possible such as O-sialon or X-sialon. A single sialon material may have one phase or a mixture of more than one phase, such as a mixture of alpha and beta phases. Various types of sialon in both alpha and beta phases have been intensely studied during the past two decades due to their remarkable mechanical properties, specifically the high hardness in alpha-sialon and the modest fracture toughness in beta-sialon. See Izhevskiy, V. A. et al. *J. Eur. Ceram. Soc* 20 (2000) 2275-95 and Ekström, T. et al. "Sialon Ceramics," *J. Am. Ceram. Soc* 75 (1992) 259-76.

According to a first aspect, the present disclosure relates to a method of making a β-SiAlON. β-SiAlON has the formula $Si_{6−z}Al_zO_zN_{8−z}$ where z ranges from more than 0 to less than 4.2. See Jack, K. H. Journal of Materials Science 11 (1976):1135-1158. In a preferred embodiment, z ranges from 1-4, more preferably 1-3. In another preferred embodiment, z is 1, 2, or 3, preferably 1 or 3. Here, the method involves the steps of mixing nanoparticles of AlN, $Al_2O_3$, and $SiO_2$ with particles of $Si_3N_4$ to form a powder mixture, and the powder mixture is spark plasma sintered to form the β-SiAlON. In one embodiment, the powder mixture is substantially free of Ca. In another embodiment, the powder mixture consists essentially of AlN, $Al_2O_3$, $SiO_2$, and $Si_3N_4$.

The nanoparticles of AlN, $Al_2O_3$, and $SiO_2$, and particles of $Si_3N_4$ may have a spherical shape, or may be shaped like cylinders, boxes, spikes, flakes, plates, ellipsoids, toroids, stars, ribbons, discs, rods, granules, prisms, cones, flakes, platelets, sheets, or some other shape. A diameter of a particle, as used herein, refers to the greatest possible distance measured from one point on the particle through the center of the particle to a point directly across from it. A diameter of a flake, as used herein, refers to the greatest possible distance measured from a first point on a perimeter of the flake through the center of the flake to a second point, also on the perimeter of the flake, directly across from the first point. In one embodiment, the nanoparticles or particles having the same chemical composition may be substantially spherical, meaning that the distance from the particle centroid (center of mass) to anywhere on the nanoparticle outer surface varies by less than 30%, preferably by less than 20%, more preferably by less than 10% of the average distance.

In one embodiment, nanoparticles or particles having the same chemical composition are monodisperse, having a coefficient of variation or relative standard deviation, expressed as a percentage and defined as the ratio of the particle diameter standard deviation (σ) to the particle diameter mean (μ), multiplied by 100%, of less than 25%, preferably less than 10%, preferably less than 8%, preferably less than 6%, preferably less than 5%. In a preferred embodiment, the nanoparticles or particles are monodisperse having a particle diameter distribution ranging from 80% of the average particle diameter to 120% of the average particle diameter, preferably 85-115%, preferably 90-110% of the average particle diameter. In another embodiment, the nanoparticles or particles are not monodisperse In one embodiment, the particles or nanoparticles are clustered in agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles.

In one embodiment, the nanoparticles or particles may have a BET surface area in a range of 10-500 m$^2$/g, 20-450 m$^2$/g, 50-400 m$^2$/g, 70-350 m$^2$/g, 70-250 m$^2$/g, 90-250 m$^2$/g, 100-230 m$^2$/g, 120-220 m$^2$/g, or 130-200 m$^2$/g.

The aluminum nitride (AlN) nanoparticles have a diameter ranging from 1-200 nm, preferably 10-150 nm, more preferably 35-80 nm, or about 50 nm. A purity of aluminum nitride nanoparticles is more than 98 wt %, preferably more than 99 wt %, more preferably more than 99.9 wt % relative to the total weight of the aluminum nitride nanoparticles. An amount of the aluminum nitride nanoparticles in the powder mixture ranges from 5-25 wt % of the total weight of the powder mixture. In one embodiment, a weight percentage of the AlN nanoparticles in the powder mixture is in a range of 5-17 wt %, preferably 6-14 wt %, more preferably 8-10 wt %, or about 9.7 wt %, relative to a total weight of the powder mixture. In another embodiment, a weight percentage of the AlN nanoparticles is 12-25 wt %, preferably 14-22 wt %, more preferably 16-20 wt %, or about 19.3 wt % relative to a total weight of the powder mixture.

The alumina (Al$_2$O$_3$) nanoparticles have a diameter ranging from 1-200 nm, preferably 10-100 nm, more preferably 15-60 nm. The alumina may be α-alumina, γ-alumina, η-alumina, θ-alumina, δ-alumina, χ-alumina, κ-alumina, or combinations thereof. In one embodiment, the alumina is α-alumina. A purity of the alumina nanoparticles is at least 99 wt %, preferably at least 99.5 wt %, more preferably at least 99.8 wt % relative to the total weight of the alumina nanoparticles. An amount of the alumina nanoparticles in the powder mixture ranges from more than 0 wt % to 20 wt %, preferably 5-18 wt %, more preferably 15-18 wt % of the total weight of the powder mixture.

The SiO$_2$ (silica) nanoparticles may have an average diameter in a range of 5-200 nm, preferably 6-100 nm, more preferably 8-50 nm, even more preferably 9-35 nm, or 10-30 nm, 12-25 nm, or 13-20 nm. The SiO$_2$ may comprise fumed silica, hydrophobic silica, amorphous silica, precipitated silica, α-quartz, β-quartz, α-tridymite, β-tridymite, α-cristobalite, β-cristobalite, some other silica, or any mixture thereof.

The SiO$_2$ nanoparticles may be present in the powder mixture at a weight percentage in a range of 1-10 wt %, preferably 2-8 wt %, even more preferably 3-7 wt %, or 4-6 wt %, or about 5.3 wt %, relative to a total weight of the powder mixture.

The particles of Si$_3$N$_4$ (silicon nitride) may have an average diameter in a range of 15 nm-60 μm. In one embodiment, the particles of Si$_3$N$_4$ are nanoparticles having an average diameter in a range of 15-100 nm, preferably 17-80 nm, preferably 18-50 nm, more preferably 20-40 nm, 22-38 nm, or 25-35 nm. In another embodiment, the particles of Si$_3$N$_4$ are microparticles having an average diameter in a range of 25-55 μm, preferably 30-52 μm, more preferably 35-50 μm, even more preferably 38-48 μm, or about 44 μm. A purity of silicon nitride particles may be more than 98 wt %, preferably more than 99 wt %, more preferably more than 99.9 wt % relative to the total weight of the silicon nitride particles. The silicon nitride particles may be α-Si$_3$N$_4$, β-Si$_3$N$_4$, γ-Si$_3$N$_4$, amorphous Si$_3$N$_4$, and mixtures thereof. In one embodiment, where the silicon nitride particles are nanoparticles, the silicon nitride is amorphous Si$_3$N$_4$. In another embodiment, where the silicon nitride particles are microparticles, the silicon nitride is β-Si$_3$N$_4$.

The particles of Si$_3$N$_4$ may be present in the powder mixture at a weight percentage of 40-85 wt %, relative to a total weight of the powder mixture. In one embodiment, the particles of Si$_3$N$_4$ may be present in the powder mixture at a weight percentage of 40-65 wt %, preferably 42-62 wt %, more preferably 43-55 wt %, more preferably 44-50 wt %, even more preferably about 45.4 wt % relative to a total weight of the powder mixture. In one embodiment, the particles of Si$_3$N$_4$ may be present in the powder mixture at a weight percentage of 65-85 wt %, preferably 70-84 wt %, more preferably 72-82 wt %, more preferably 75-80 wt %, or about 78.9 wt % relative to a total weight of the powder mixture.

In one embodiment, a total mass of the powder mixture may be 1-100 g, preferably 2-50 g, more preferably 3-10 g, or about 5 g. Depending on use, some embodiments may use a total mass of the mixture that is greater than 100 g, for example, in a pilot plant or in an industrial scale chemical plant.

The aforementioned AlN, Al$_2$O$_3$, SiO$_2$, and Si$_3$N$_4$ may start as clusters, aggregates, powders, or particles. In a preferred embodiment, the components are particles. The aforementioned components may be mixed by sonication and/or ball milling. In one embodiment, the powder mixture is ultrasonicated as a suspension in an organic solvent and dried before the spark plasma sintering. In a preferred embodiment, the powder mixture is dispersed in a sufficient amount of an organic solvent, preferably volatile at room temperature, to form a slurry, which is sonicated for 10-30 minutes, preferably 15-25 minutes, with an ultrasonic probe. Non-limiting examples of the organic solvent include hydrocarbons, such as hexane, alcohols, such as ethanol, methanol, propanol, isopropanol, butanol, ketones, and esters. Preferably, the solvent is an alcohol. More preferably, the alcohol has a melting point lower than 0° C. and a boiling point lower than 100° C. In a preferred embodiment, the alcohol is ethanol. The organic solvent may act as a viscosity modifying agent, providing a suitable viscosity for handling the slurry and accomplishing the mixing. In addition, the solvent may have a viscosity ranging from 0.5-2 cP, preferably 0.5-1.5 cP, more preferably 0.5-1.2 cP. Any amount of liquid that accomplishes the mixing is acceptable. Preferably, the solids content is between 15-50 vol %, preferably 15-35 vol %, more preferably 20-30 vol % of the total volume of the slurry. Below this limit, mixing may be ineffective or separation by settling may occur, although a solid content below this limit may still be used depending on the particle size, solvent, and mixing procedure. Above the limit, in some instances, the viscosity may be too high and mixing and de-agglomeration may not be effective. The volatile organic solvent may evaporate during sonication, leaving no residue. Preferably, the slurry is heated to 75-85° C. for 2-36 hours, preferably 8-24 hours, more preferably 12-20 hours to remove the solvent completely.

In one embodiment, the powder mixture is milled with a miller, such as a planetary miller, an attrition mill, a vibratory mill or a high energy miller. Non-limiting examples of milling media (i.e. bowl and balls) include tungsten carbide, silicon nitride, and alumina. Preferably, silicon nitride milling media may be employed to minimize contamination of the powder mixture. In one embodiment, a weight ratio of the balls to the powder mixture ranges from 5:1 to 20:1, preferably from 5:1 to 10:1, more preferably from 7:1 to 10:1. A process control agent, such as stearic acid, may be added to the powder mixture to ensure the powder mixture does not cake. An amount of the process control agent ranges from more than 0 wt % to 2 wt %, preferably 0.5-1.5 wt %, more preferably 0.5-1 wt % of the weight of the powder mixture. In a preferred embodiment, no process control agent is employed. In one embodiment, the milling is performed in an inert atmosphere, preferably provided by argon gas. The powder mixture may be milled for up to 10 hours, or up to 5 hours, or up to 1 hour, preferably for 10-30 minutes, preferably for 15-25 minutes. However, in one embodiment, the powder mixture may not be milled. In one embodiment, one or more of the nanoparticles or particles may be milled individually or together before being mixed with other components to form the powder mixture. In another embodiment, none of the nanoparticles or particles are milled before being mixed to form the powder mixture.

The powder mixture is sintered to form the β-SiAlON. The sintering process may be hot pressing, hot isostatic pressure, pressureless sintering or spark plasma sintering. Preferably, the sintering is a spark plasma sintering (SPS) process because this process densifies the compacted powders faster than the aforementioned processes and at relatively low temperatures. See Salamon, David, Zhijian Shen, and Pavol Šajgalík. Journal of the European Ceramic Society 27.6 (2007): 2541-2547. As used here, a compound subjected to spark plasma sintering may be considered "SPSed." In one embodiment, the sintering is performed in an atmosphere consisting essentially of nitrogen gas. In a preferred embodiment, the atmosphere is nitrogen gas with a purity of more than 99.99%.

The powder mixture may be poured into a graphite die with a diameter of 10-50 mm, preferably 15-35 mm, more preferably 15-25 mm, or about 20 mm. The powder mixture may be compacted at ambient temperature. In a preferred embodiment, a uniaxial pressure is applied to the die in a direction that is normal to the ground. The pressure ranges from 20-150 MPa, preferably 20-100 MPa, more preferably 45-55 MPa, or about 50 MPa. The sintering involves heating the powder mixture at a rate ranging from 5-600° C./min, preferably 50-200° C./min, more preferably 80-120° C./min, or 85-115° C./min, or 90-110° C./min, or 95-105° C./min, or about 100° C./min. The heating may comprise of at least one heating step. In a preferred embodiment, the heating consists of only one heating step. The sintering is performed at a temperature ranging from 1450-1600° C., preferably 1470-1550° C., more preferably 1480-1520° C., or 1490-1510° C., or 1495-1505° C., or about 1500° C. The powder mixture is spark plasma sintered (meaning held at the temperature of 1450-1600° C.) for a time in a range of 15-45 min, preferably 20-40 min, more preferably 25-35 min, or about 30 min. This produces the β-SiAlON.

In one embodiment, the method also involves rapidly cooling the β-SiAlON ceramic to about 20-40° C. or 25-35° C. after the sintering The β-SiAlON ceramic starts to cool down once the current is switched off. The cooling of the β-SiAlON ceramic may be controlled and/or accelerated with a pre-set program. In a preferred embodiment, the ceramic is cooled down at a rate ranging from 1-20° C./s, preferably 1-10° C./s, more preferably 5-10° C./s by a flow of nitrogen gas. The ceramic may be cooled to a temperature ranging from 20-40° C., preferably 20-30° C., more preferably 20-25° C. The method may also involve polishing, etching, and/or shaping the β-Sialon product.

In one embodiment, the empirical formula determined from a composite may be slightly different than the empirical formula of the mixture before the sintering. Of a formed composite, weight percentages or empirical formula of Si, Al, O, and N may be determined by atomic absorption spectroscopy, energy dispersive X-ray spectroscopy, a carrier-gas-heat-extraction method, or some other technique. In one embodiment, the β-SiAlON is substantially free of Ca, meaning that the β-SiAlON comprises less than 0.1 wt % Ca, preferably less than 0.01 wt % Ca, or about 0 wt % Ca relative to a total weight of the β-SiAlON. In one embodiment, the β-SiAlON consists essentially of Si, Al, O, and N, meaning that of the total weight of the β-SiAlON, at least 99.9 wt %, at least 99.99 wt %, or at least 99.999 wt % of the β-SiAlON is limited to only Si, Al, O, and N. In one embodiment, the β-SiAlON has the formula $Si_5AlN_7$. In another embodiment, the β-SiAlON has the formula $Si_3Al_3O_3N_5$.

In one embodiment, the β-SiAlON has a thermal expansion coefficient in a range of 2.20-2.45 ppm/K, preferably 2.25-2.35 ppm/K, more preferably about 2.29 ppm/K, or preferably 2.30-2.42 ppm/K, more preferably about 2.39 ppm/K.

The mechanical properties of the β-SiAlON may be readily measured by standard tests. In particular, for the purposes of this disclosure, the fracture toughness of the ceramic is evaluated by the indentation technique, and the hardness with the Vickers hardness method (10 kg load) employing a universal hardness tester.

In one embodiment, the β-SiAlON has a Vickers Hardness ($HV_{10}$) in a range of 18-25 GPa, preferably 18.5-22 GPa, more preferably 19-21 GPa, or about 19.2 GPa. In one embodiment, the β-SiAlON has a fracture toughness in a range of 7.0-10.0 MPa·m$^{1/2}$, preferably 7.8-9.5 MPa·m$^{1/2}$, more preferably 8.5-9.2 MPa·m$^{1/2}$, or about 8.9 MPa·m$^{1/2}$.

In one embodiment, the β-SiAlON has a density in a range of 2.80-2.95 g/cm$^3$, preferably 2.85-2.94 g/cm$^3$, more preferably 2.89-2.93 g/cm$^3$, or about 2.93 g/cm$^3$. In another embodiment, the β-SiAlON has a density in a range of 3.20-3.30 g/cm$^3$, preferably 3.21-3.28 g/cm$^3$, more preferably 3.22-3.27 g/cm$^3$, or about 3.25 g/cm$^3$.

The grain size and morphology of the β-SiAlON ceramic are studied with electron microscopy, preferably scanning electron microscopy (SEM). The β-SiAlON ceramic has micropores and submicron pores. The size of the micropores ranges from 1-5 μm, preferably 1-4 μm, more preferably 1-3 μm. The size of the submicron pores ranges from 50-400 nm, preferably 100-300 nm, more preferably 100-250 nm. The porosity of the β-SiAlON ceramic is at most 20%, preferably at most 15%, preferably at most 5%, and more preferably at most 1%.

The grains of the β-SiAlON ceramic may be elongated, equiaxed, needles and/or flakes. The elongated grains may have a height ranging from 1-20 μm, preferably 1-15 μm, more preferably 1-10 μm, and a width ranging from 0.1-4 μm, preferably 0.5-3 μm, more preferably 0.5-2 μm. The aspect ratio of the elongated grains ranges from 2-200, preferably 10-150, more preferably 10-100. The equiaxed grains have a diameter ranging front 100-1,000 nm, preferably 200-600 nm, more preferably 300-500 nm. The needle-like grains have a length ranging from 1-20 μm, preferably 1-15 μm, more preferably 1-10 μm. The flake-like grains have a diameter of 1-15 μm, preferably 5-15 μm, more preferably 7-10 μm. The needle-like and flake-like grains may be β-SiAlON grains.

The examples below are intended to further illustrate protocols for preparing and characterizing the β-Sialon, and are not intended to limit the scope of the claims.

EXAMPLE 1

Experimental Procedure

Two $Si_3N_4$ powders with different structures and sizes (β-$Si_3N_4$, particle size ~44 μm, Sigma-Aldrich, Germany;

amorphous Si₃N₄, particle size 20-40 nm, Chempur, Germany) were used as a starting powder. Other additives incorporated were AlN (size=50 nm, Chempur, Germany), Al$_2$O$_3$ (size<50 nm, Sigma-Aldrich, Germany), and SiO$_2$ (10-20 nm, Sigma-Aldrich, Germany) to synthesize β-Sialon (general formula of Si$_{6-z}$Al$_z$O$_z$N$_{8-z}$). In the following text, sample IDs (A-ZX-T or B-ZX-T) starting with "A" represent samples synthesized using amorphous Si$_3$N$_4$, whereas those starting with "B" represent samples synthesized using β-Si$_3$N$_4$. Moreover, "X" having the value of 1, 2, or 3, represents the value of the variable Z in the general formula of β-Sialon, whereas "T" represents the synthesis temperature in degrees Celsius. The schematic shown in FIG. 1 exhibits the selected compositions (marked by centrally-located circles) used in the present study. The weight percentage of the starting powders along with their respective chemical formula is shown in Table 1 and Table 2.

TABLE 1

Chemical composition of the starting materials in wt. % with amorphous Si$_3$N$_4$ as a major constituent.

| Sample ID | Composition | *A-Si$_3$N$_4$ | AlN | Al$_2$O$_3$ | SiO$_2$ |
| --- | --- | --- | --- | --- | --- |
| A-Z1-1400 | Si$_5$AlON$_7$ | 78.90 | 9.71 | 6.05 | 5.34 |
| A-Z1-1500 | Si$_5$AlON$_7$ | 78.90 | 9.71 | 6.05 | 5.34 |
| A-Z1-1600 | Si$_5$AlON$_7$ | 78.90 | 9.71 | 6.05 | 5.34 |
| A-Z2-1400 | Si$_4$Al$_2$O$_2$N$_6$ | 62.11 | 14.52 | 18.06 | 5.32 |
| A-Z2-1500 | Si$_4$Al$_2$O$_2$N$_6$ | 62.11 | 14.52 | 18.06 | 5.32 |
| A-Z2-1600 | Si$_4$Al$_2$O$_2$N$_6$ | 62.11 | 14.52 | 18.06 | 5.32 |
| A-Z3-1400 | Si$_3$Al$_3$O$_3$N$_5$ | 45.40 | 19.30 | 30.00 | 5.30 |
| A-Z3-1500 | Si$_3$Al$_3$O$_3$N$_5$ | 45.40 | 19.30 | 30.00 | 5.30 |
| A-Z3-1600 | Si$_3$Al$_3$O$_3$N$_5$ | 45.40 | 19.30 | 30.00 | 5.30 |

*A = amorphous

TABLE 2

Chemical composition of the starting materials in wt. % with β-Si$_3$N$_4$ as a major constituent.

| Sample ID | Starting Composition | β-Si$_3$N$_4$ | AlN | Al$_2$O$_3$ | SiO$_2$ |
| --- | --- | --- | --- | --- | --- |
| B-Z1-1400 | Si$_5$AlON$_7$ | 78.90 | 9.71 | 6.05 | 5.34 |
| B-Z1-1500 | Si$_5$AlON$_7$ | 78.90 | 9.71 | 6.05 | 5.34 |
| B-Z1-1600 | Si$_5$AlON$_7$ | 78.90 | 9.71 | 6.05 | 5.34 |
| B-Z1-1700 | Si$_5$AlON$_7$ | 78.90 | 9.71 | 6.05 | 5.34 |
| B-Z2-1400 | Si$_4$Al$_2$O$_2$N$_6$ | 62.11 | 14.52 | 18.06 | 5.32 |
| B-Z2-1500 | Si$_4$Al$_2$O$_2$N$_6$ | 62.11 | 14.52 | 18.06 | 5.32 |
| B-Z2-1600 | Si$_4$Al$_2$O$_2$N$_6$ | 62.11 | 14.52 | 18.06 | 5.32 |
| B-Z2-1700 | Si$_4$Al$_2$O$_2$N$_6$ | 62.11 | 14.52 | 18.06 | 5.32 |
| B-Z3-1400 | Si$_3$Al$_3$O$_3$N$_5$ | 45.40 | 19.30 | 30.00 | 5.30 |
| B-Z3-1500 | Si$_3$Al$_3$O$_3$N$_5$ | 45.40 | 19.30 | 30.00 | 5.30 |
| B-Z3-1600 | Si$_3$Al$_3$O$_3$N$_5$ | 45.40 | 19.30 | 30.00 | 5.30 |
| B-Z3-1700 | Si$_3$Al$_3$O$_3$N$_5$ | 45.40 | 19.30 | 30.00 | 5.30 |

Figure 2:
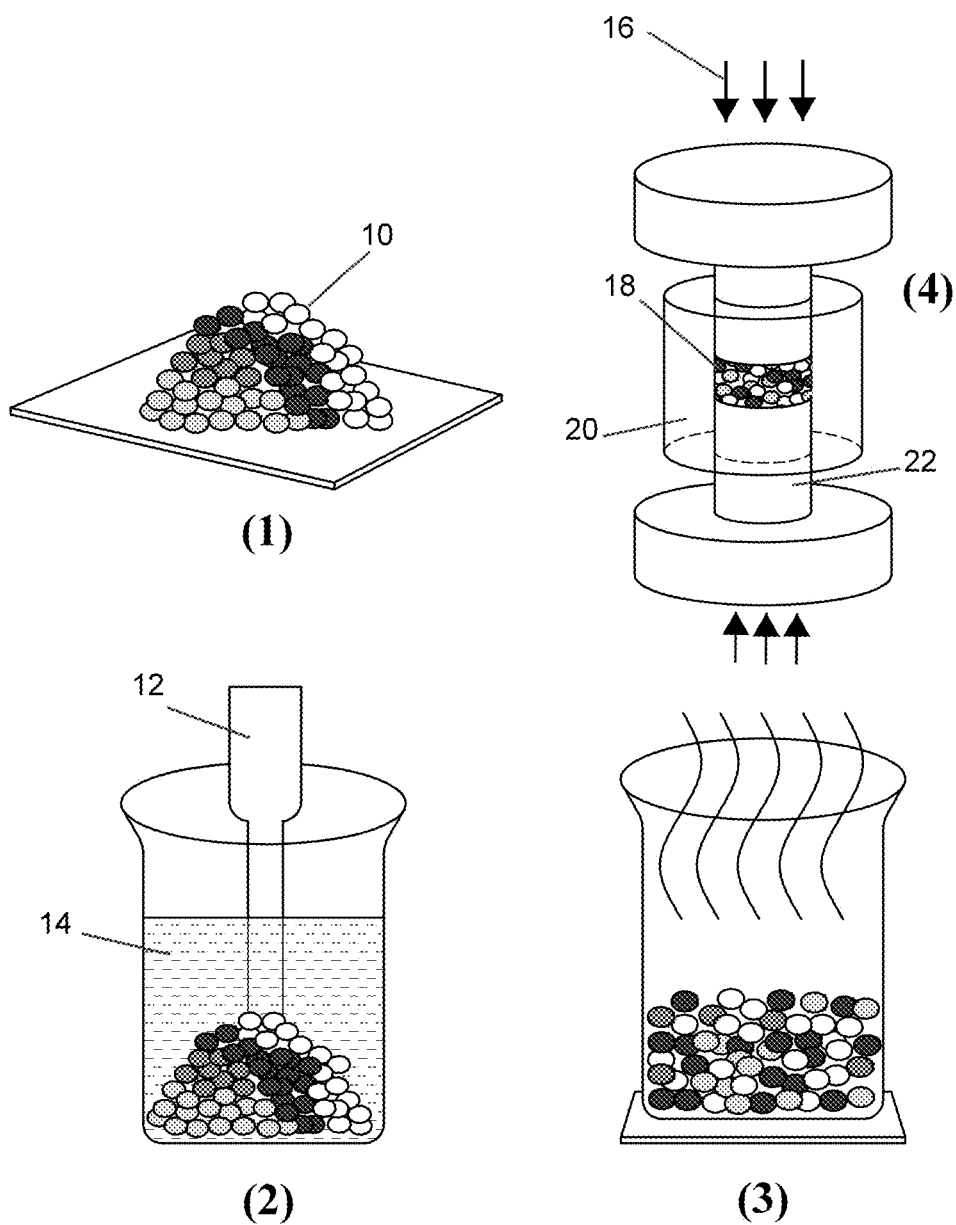
FIG. 2 is a diagram of the procedure for synthesizing Sialon compositions from the starting powder mixture.

According to chemical equations (eq.) 1, 2, and 3, representing Z=1, 2, and 3, respectively, each precursor was carefully weighed to obtain powder mixtures of 5 g to synthesize Sialon samples according to Table 1 and Table 2. FIG. 2 illustrates the procedure. Complete mixing of the weighed powder mixture 10 (at (1) in FIG. 2) was achieved with an ultrasonic probe sonicator 12 (model VC 750, Sonics, USA) for approximately 15 min, where ethanol 14 was used as a mixing medium (at (2) in FIG. 2). The sonicated mixtures were subsequently dried in an oven overnight at 80° C. to evaporate the ethanol (and moisture) completely (at (3) in FIG. 2). The dried powder mixture 18 was placed into a 20 mm-diameter graphite die 20 for SPS (FCT system, model HP D5, Germany), with punch 22 for transmitting an applied pressure 16 as illustrated at (4) in FIG. 2. The synthesized pellet was processed at four different temperatures of 1400° C., 1500° C., 1600° C. and 1700° C. with a holding time of 30 min at each temperature and under constant uniaxial pressure of 50 MPa. A heating rate of 100° C./min was adopted, followed by the cooling stage, where samples were cooled at 100° C./min to room temperature.

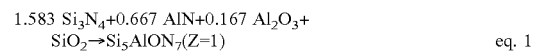

$$1.583\ Si_3N_4 + 0.667\ AlN + 0.167\ Al_2O_3 + SiO_2 \rightarrow Si_5AlON_7 (Z=1) \quad \text{eq. 1}$$

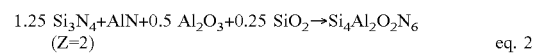

$$1.25\ Si_3N_4 + AlN + 0.5\ Al_2O_3 + 0.25\ SiO_2 \rightarrow Si_4Al_2O_2N_6 (Z=2) \quad \text{eq. 2}$$

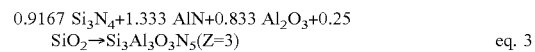

$$0.9167\ Si_3N_4 + 1.333\ AlN + 0.833\ Al_2O_3 + 0.25\ SiO_2 \rightarrow Si_3Al_3O_3N_5 (Z=3) \quad \text{eq. 3}$$

All of the synthesized samples were carefully ground to remove the graphite film and expose the fresh surface of the samples to conduct density measurements via Archimedes' principle using a densitometer (Mettler Toledo, USA). Further grinding and polishing of the samples were performed with an automatic grinding and polishing machine (Automet 300 Buehler, USA) with diamond grinding wheels (grit size ranges: 74, 40, 20, and 9 µm) and clothes with diamond suspensions (size: 6 and 3 µm), respectively, to prepare the samples for microstructural examinations and assessments of their mechanical properties. X-ray diffraction (XRD) analysis was carried out to identify the phases present in the spark-plasma-sintered ("SPSed") samples. A Rigaku Mini-Flex X-ray diffractometer (Japan) equipped with a Cu $K_{\alpha1}$ radiation source (γ=0.15416 nm) operated at a tube current of 10 mA and voltage of 30 kV. An X-ray diffractometer (Rigaku Ultima IV, Japan) equipped with a high-temperature sample stage was used to investigate the phase evolution at 100° C., 800° C., 1200° C., 1300° C., 1400° C. XRD scans of powder mixtures were carried out at a designated temperature with a heating rate of 15° C./min and a 5 min holding time at each temperature. Vickers hardness measurements were carried out on a universal hardness tester (Zwick-Roell, ZHU250, Germany) under a load of 98 N (10 kg). The fracture toughness of the sample was calculated by the indentation method using Eq. 4:

$$K_{ic} = 0.15 k \left(\frac{c}{a}\right)^{-1.5} \times C_f (H \times a^{0.5}) \quad \text{eq. 4}$$

where k (=3.2) is the correction factor, $C_f$ (=3) is the constraint factor, H represents hardness, 2a represents the average diagonal indent length and 2c is the crack length. A field-emission scanning electron microscope (Lyra3®, Tescan, Czech Republic) with a maximum accelerating voltage of 30 kV was used to characterize the microstructures, and a field-emission scanning electron microscope equipped with energy-dispersive X-ray spectroscopy (EDX) silicon drift detector (X-Max$^N$®, Oxford Instruments, UK). The structural morphologies and elemental composition of the synthesized samples were observed by field-emission scanning electron microscopy (FESEM) and EDX, respectively. Prior to FESEM microstructure observations, finely polished samples were etched for approximately 1-2 s using concentrated HF acid. The thermal expansion coefficient (α) of the samples was measured using a Mettler Toledo instrument (TMA/SDTA-LF/1100, USA). Smooth-surfaced samples were cut to appropriate dimensions (4 mm×4 mm×2 mm) for analysis of the coefficient of thermal expansion of the samples from room temperature to 600° C. with a heating rate of 15° C./min.

EXAMPLE 2

Results and Discussion≤Characterization of as-Received Powder Precursors

Figure 3A:
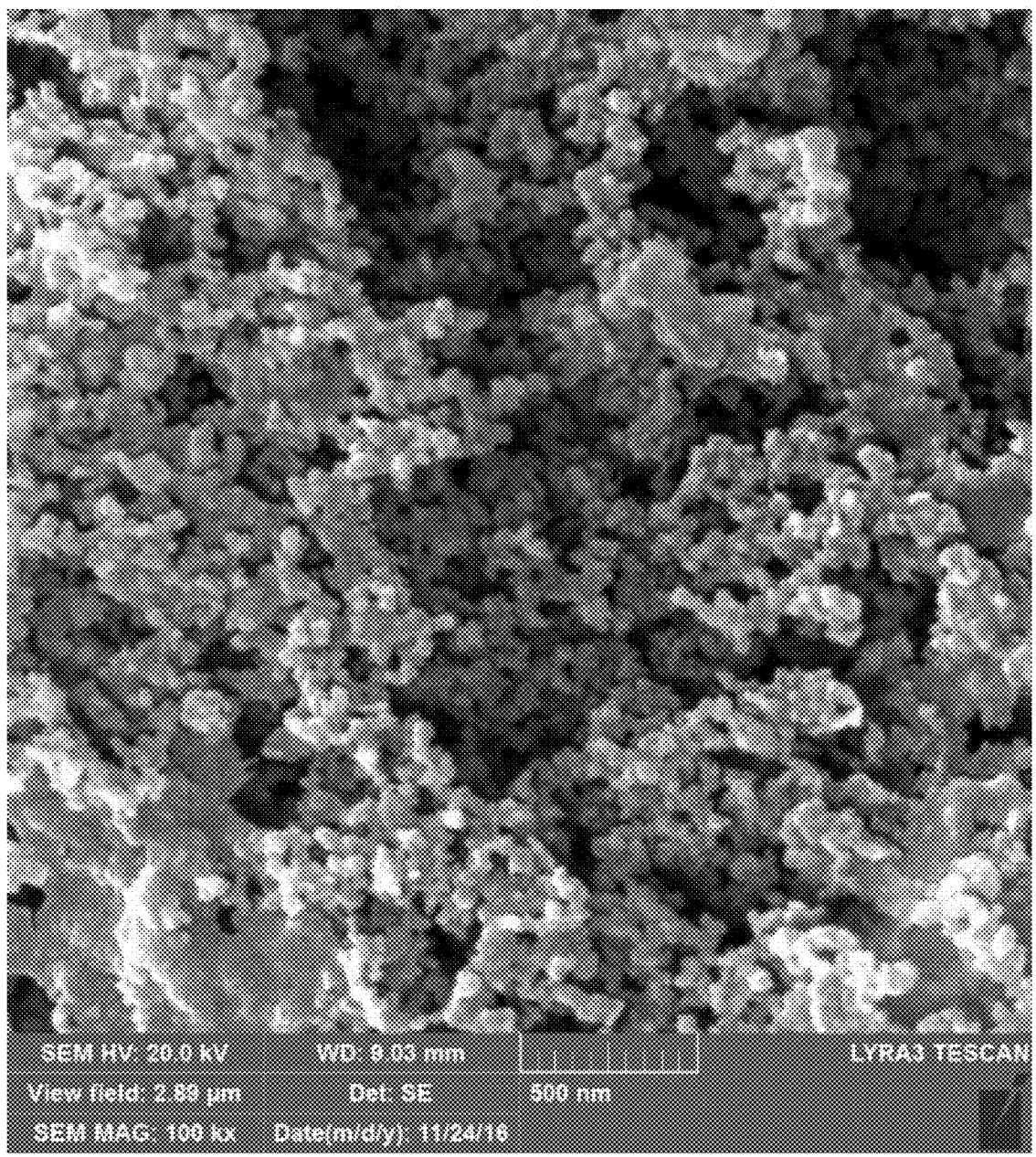
FIG. 3A is a FESEM micrograph of as-received nanosized amorphous $Si_3N_4$ (20-40 nm particle size).
Figure 3B:
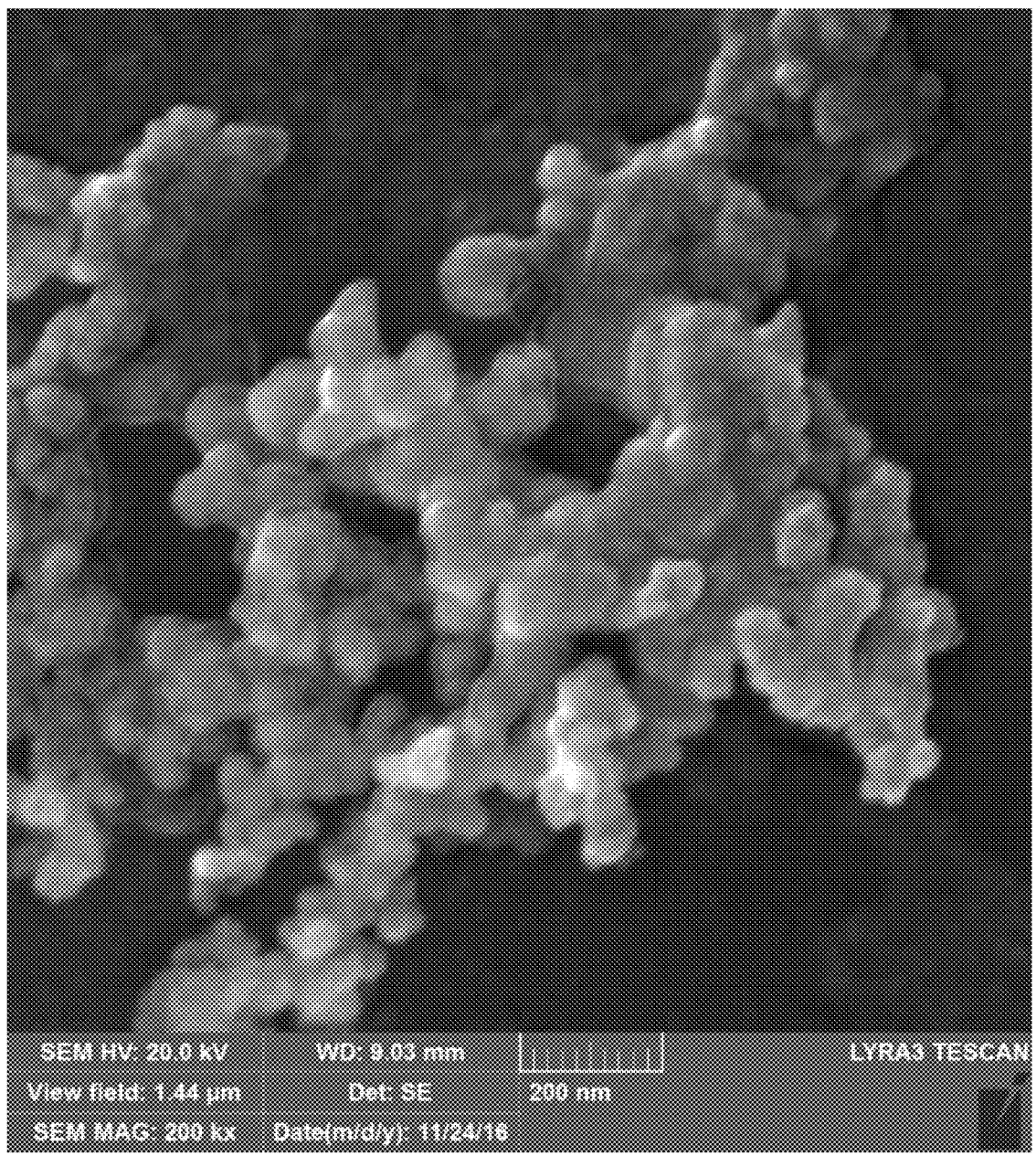
FIG. 3B is a FESEM micrograph of the same sample of FIG. 3A at higher magnification
Figure 4A:
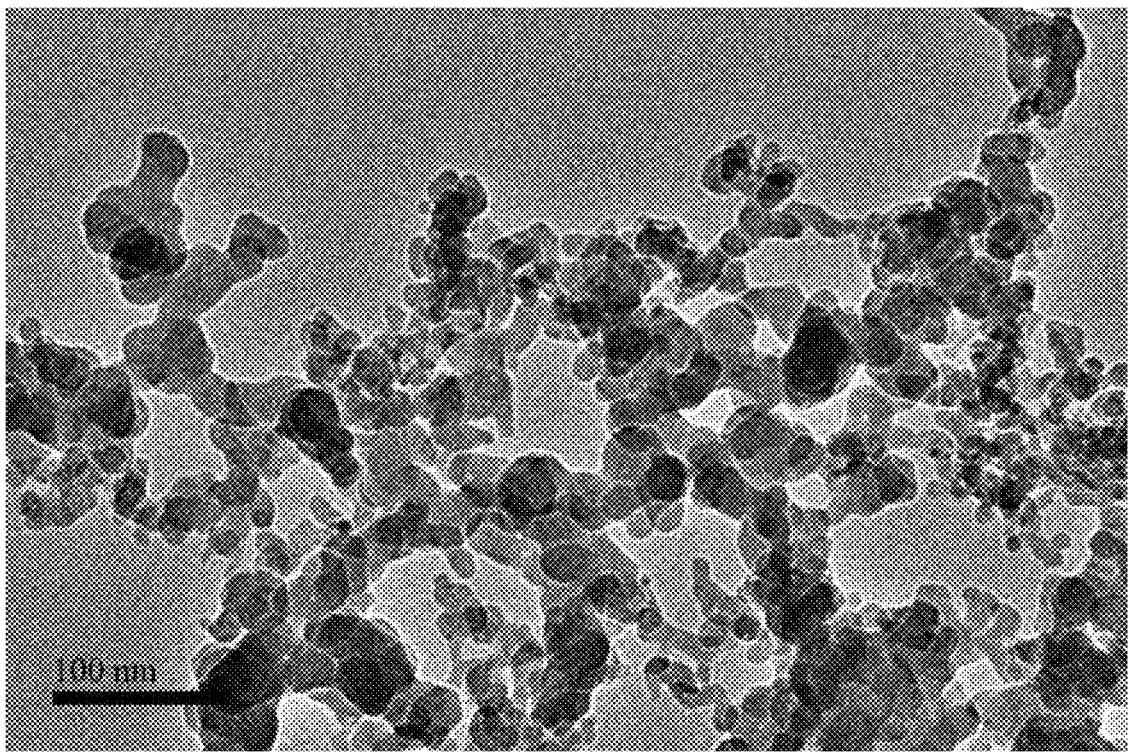
FIG. 4A is a TEM image of the as-received nanosized amorphous $Si_3N_4$, scale bar 100 nm.
Figure 4B:
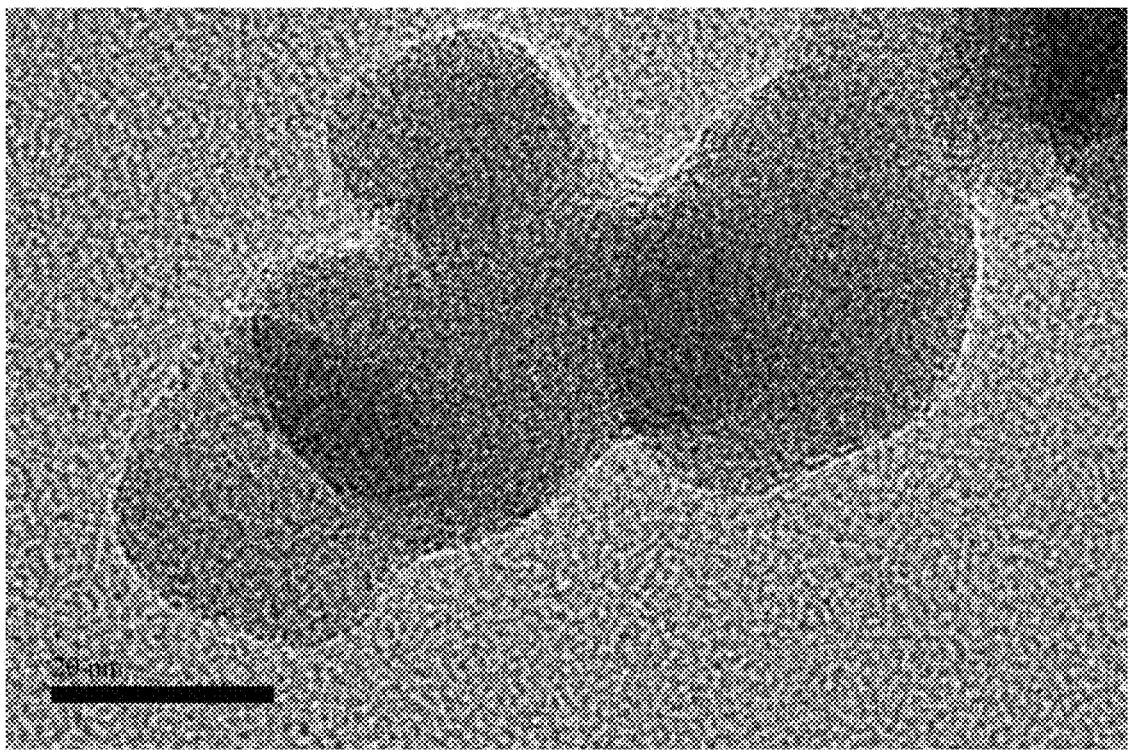
FIG. 4B is a high-resolution TEM of the sample of FIG. 4A, scale bar 20 nm.
Figure 4C:
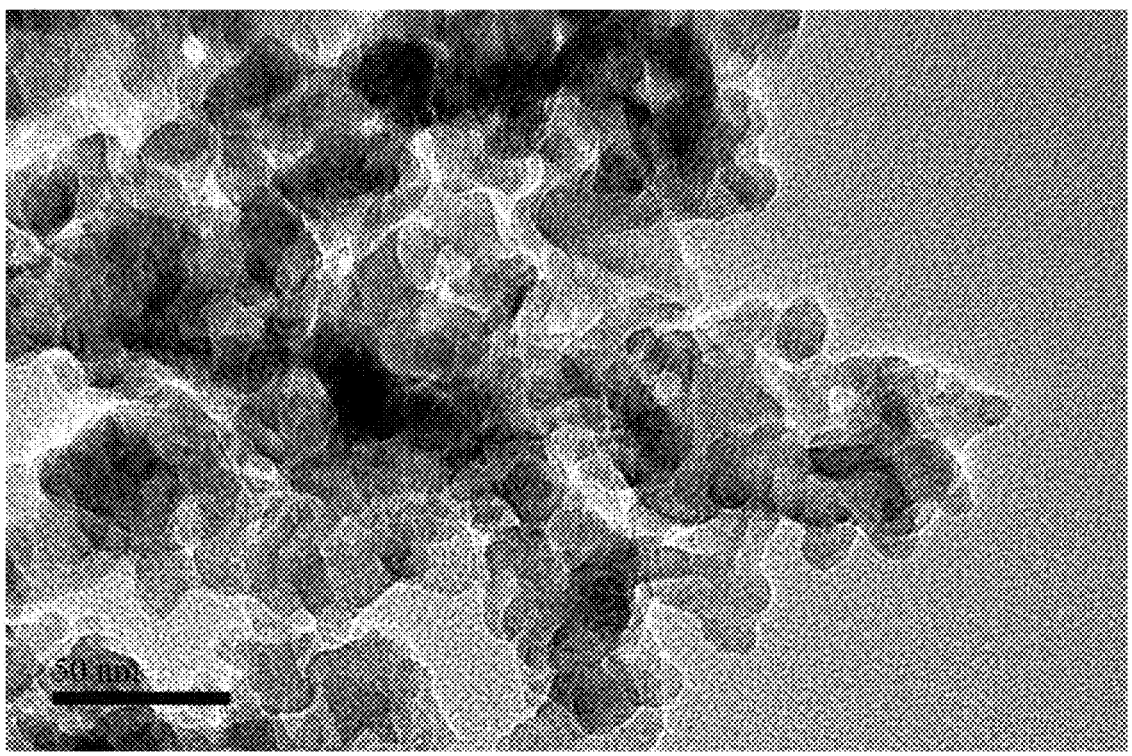
FIG. 4C is a TEM image of the as-received $SiO_2$ powders, scale bar 50 nm.
Figure 4D:
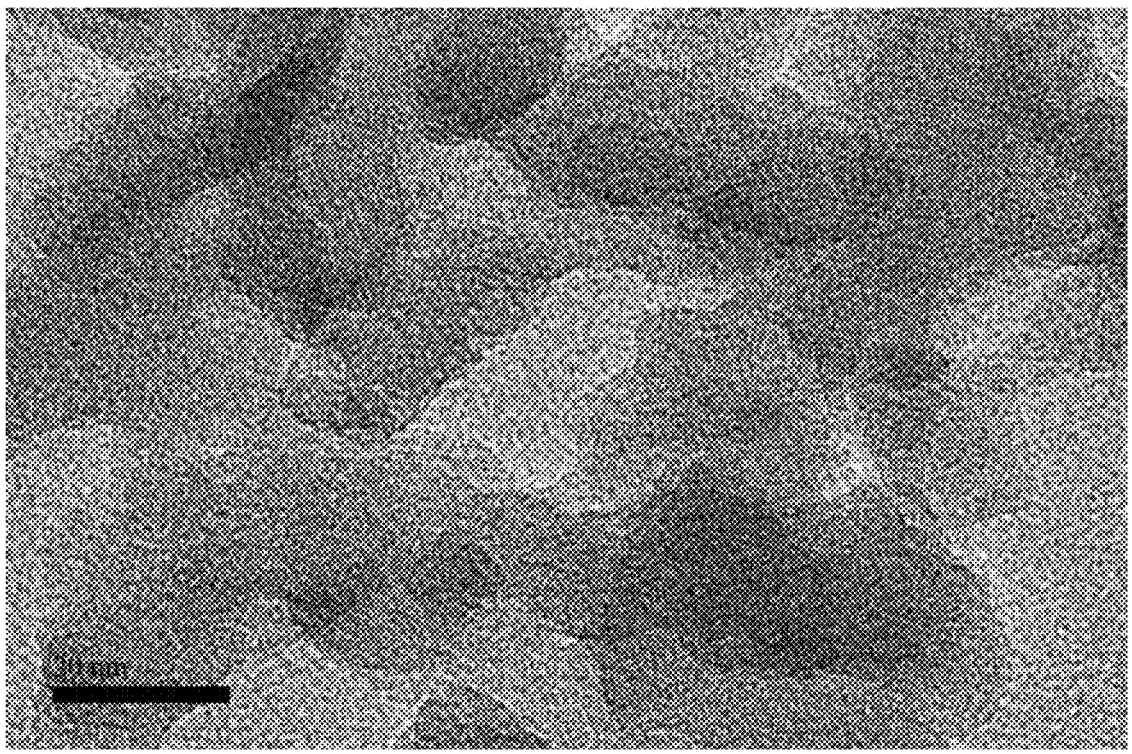
FIG. 4D is a high-resolution TEM of the sample of FIG. 4C, scale bar 20 nm.
Figure 4E:
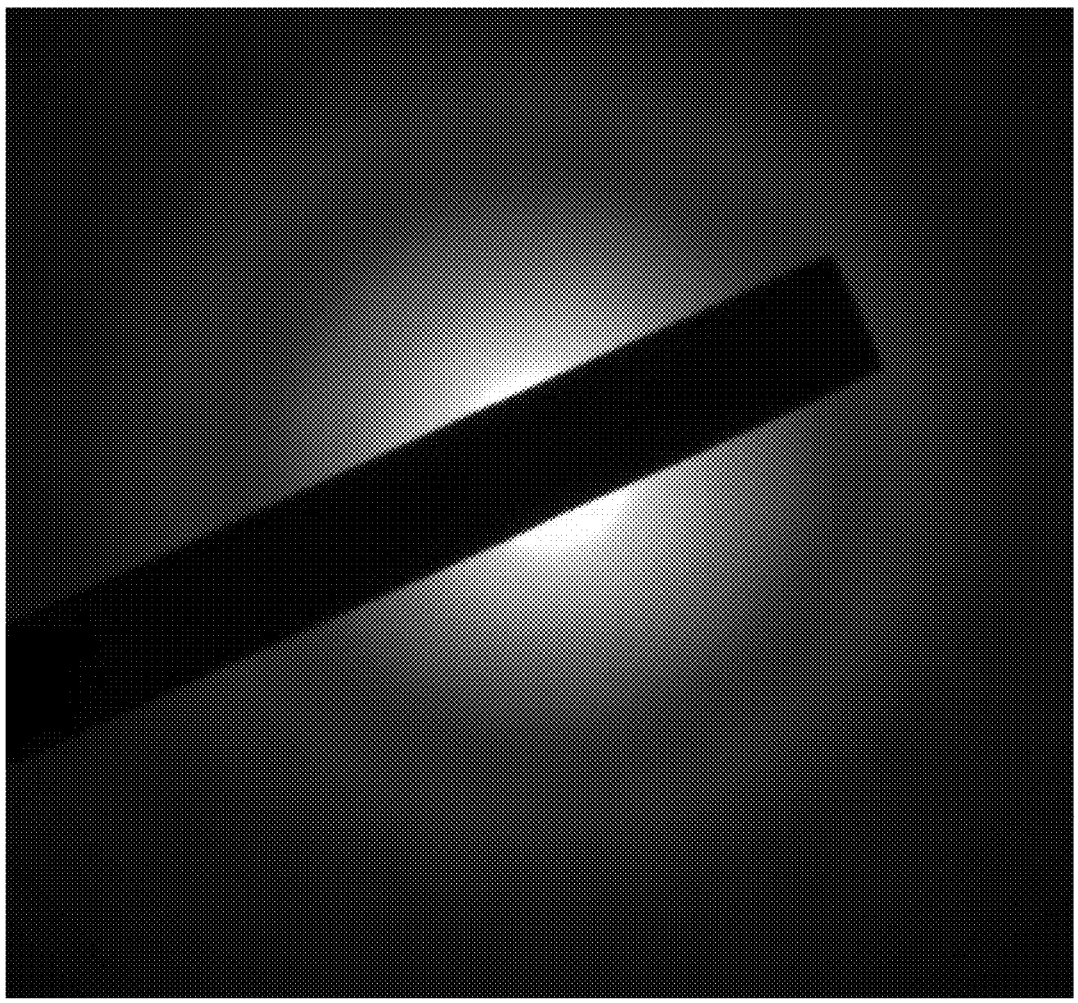
FIG. 4E is a SAED pattern corresponding to FIG. 4A.

FESEM micrographs of the as-received nanosized amorphous $Si_3N_4$ at different magnifications are shown in FIGS. 3A-3B. The micrographs revealed that the particle size of the powder is uniform. Further investigation by TEM confirmed that the particle sizes of the amorphous $Si_3N_4$ and the $SiO_2$ are in the ranges 20-40 nm and 10-20 nm, respectively (FIGS. 4A-4D). The superimposed selected-area electron diffraction (SAED) pattern confirms the presence of diffused rings and the amorphous nature of the as-received nanosized $Si_3N_4$ and $SiO_2$ powders, as indicated by the absence of lattice fringes in the high-resolution TEM images (FIGS. 4B and 4D, respectively).

Figure 5A:
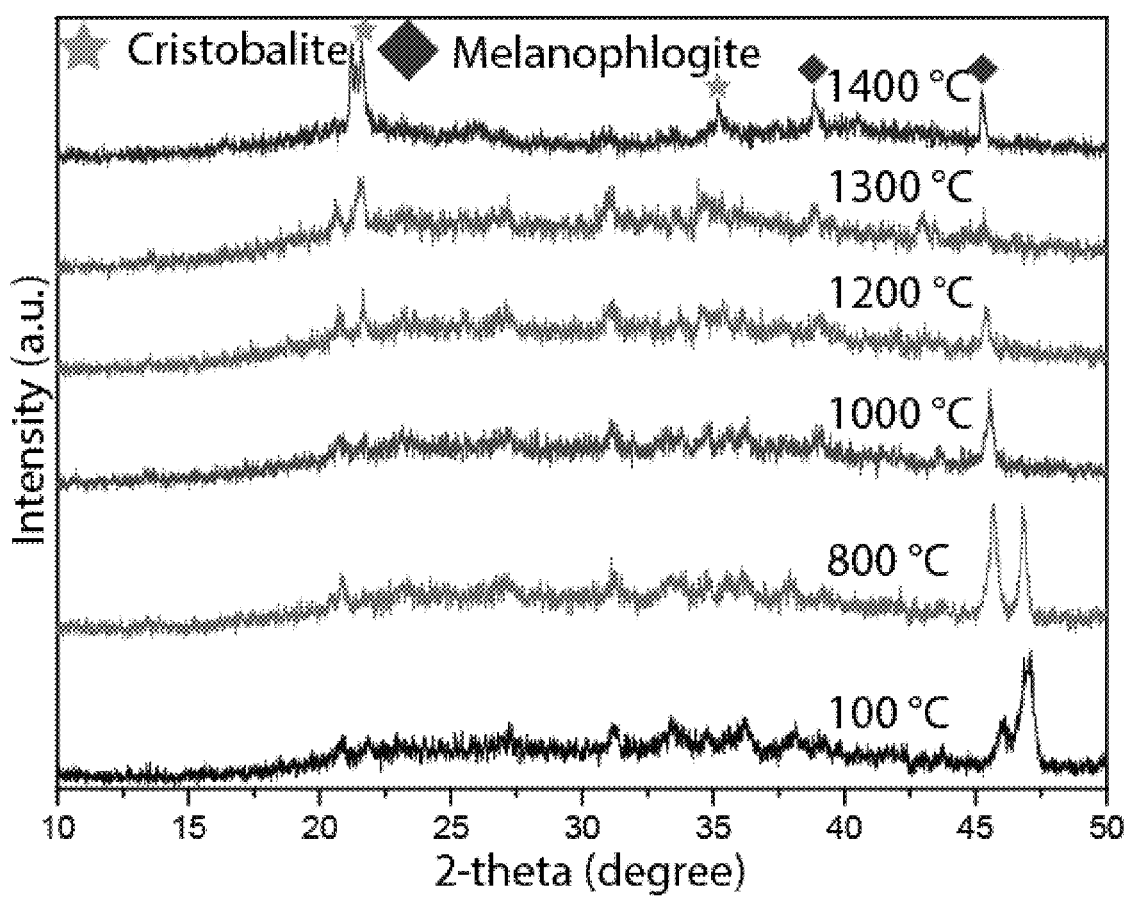
FIG. 5A is a high-temperature XRD patterns of starting powder mixtures containing nanosized amorphous $Si_3N_4$ (A-Z1).

High-temperature XRD scans were performed to analyse the phase evolution of the starting powder mixtures at different temperatures. The XRD pattern in FIG. 5A is for the starting powder mixture containing nanosized amorphous $Si_3N_4$ (A-Z1). The low-intensity and broad XRD peaks indicate the presence of nanosized crystallites in the powder. The high-temperature XRD patterns (FIG. 5A) show that no second phase (cristobalite) peaks appeared until the temperature was raised above 1000° C. The XRD pattern corresponding to 1400° C. shows peaks for cristobalite and melanophlogite intermediate phases. Cristobalite is a high-temperature polymorph of silica, stable above 1470° C. and below the melting temperature of 1627° C. See R. T. Downs and D. C. Palmer, "The pressure behavior of a cristobalite," *Am. Mineral.*, vol. 79, pp. 9-14, 1994. Melanophlogite is a thermally stable silica polymorph that converts to cristobalite above 900° C.

Figure 5B:
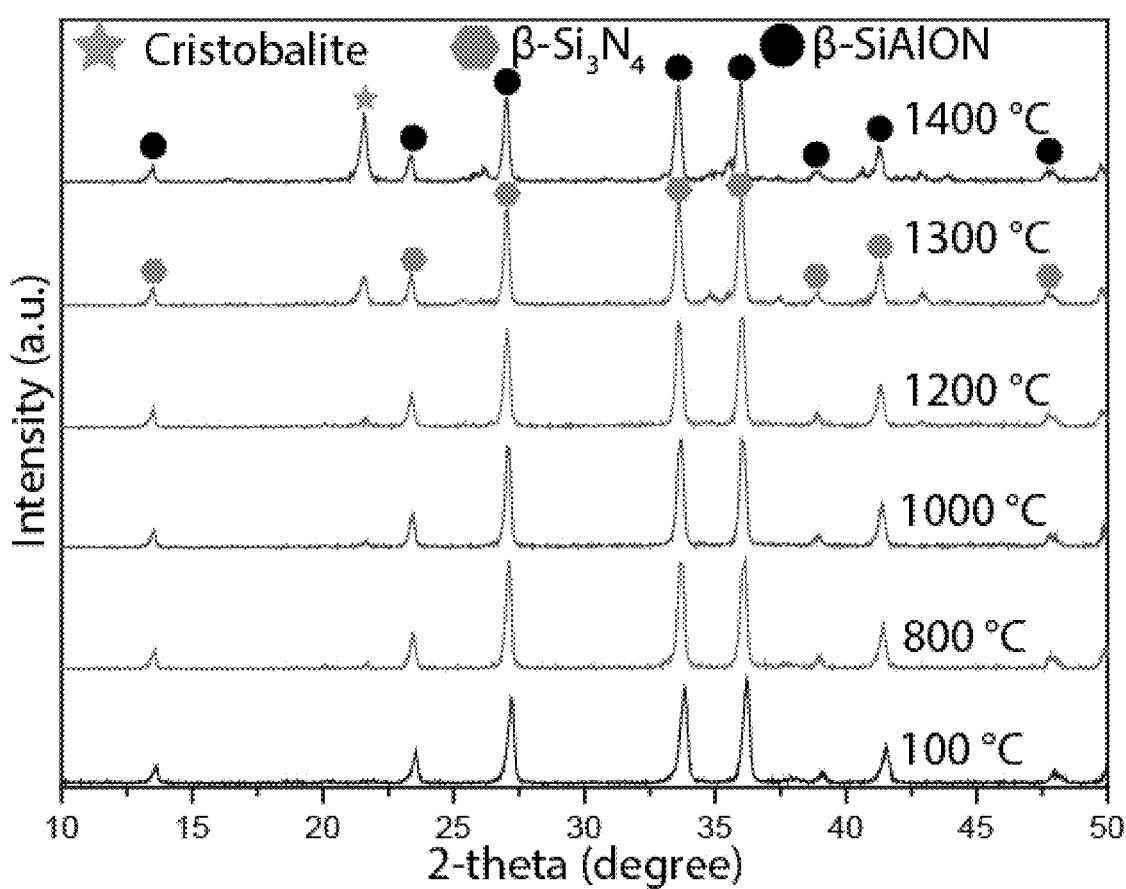
FIG. 5B is a high-temperature XRD patterns of starting powder mixtures containing microsized β-$Si_3N_4$ (B-Z1).

The high-temperature XRD pattern of the starting powder mixture containing microsized β-$Si_3N_4$ (B-Z1) is shown in FIG. 5B. The XRD pattern recorded at 1400° C. reveals the formation of a major β-Sialon phase along with an intermediate cristobalite phase. A comparison of the XRD pattern of SPSed sample B-Z1-1400 and the high-temperature XRD pattern of B-Z1 (FIG. 5B) reveals no evidence of the presence of the second phase in SPSed sample B-Z1-1400. This lack of a second phase suggests that a holding time of 30 min and a uniaxially applied pressure of 50 MPa may have promoted instant dissolution and transformation of the cristobalite phase into the β-Sialon phase. A synthesis temperature lower than 1400° C. might not be sufficient to form β-Sialon by diffusion or by other solid-stale synthesis mechanisms, such as solution-diffusion and precipitation followed by bridging between freshly-synthesized grains.

These observations, such as the transformation of β-Sialon from nanosized amorphous $Si_3N_4$ at a relatively low temperature of 1400° C., which resulted in improved properties ($H_{V10}$≈18.20 GPa), prove that the nanoscale precursors were advantageous in accelerating the reaction kinetics of the synthesis and enhancing the properties of the final product. Specifically, the particle packing and solution-precipitation stages lead to a lower synthesis temperature (1400° C.) and a shorter holding time (30 min) compared with those when the microsized (β-$Si_3N_4$) starting powder mixture was used.

Figure 6A:
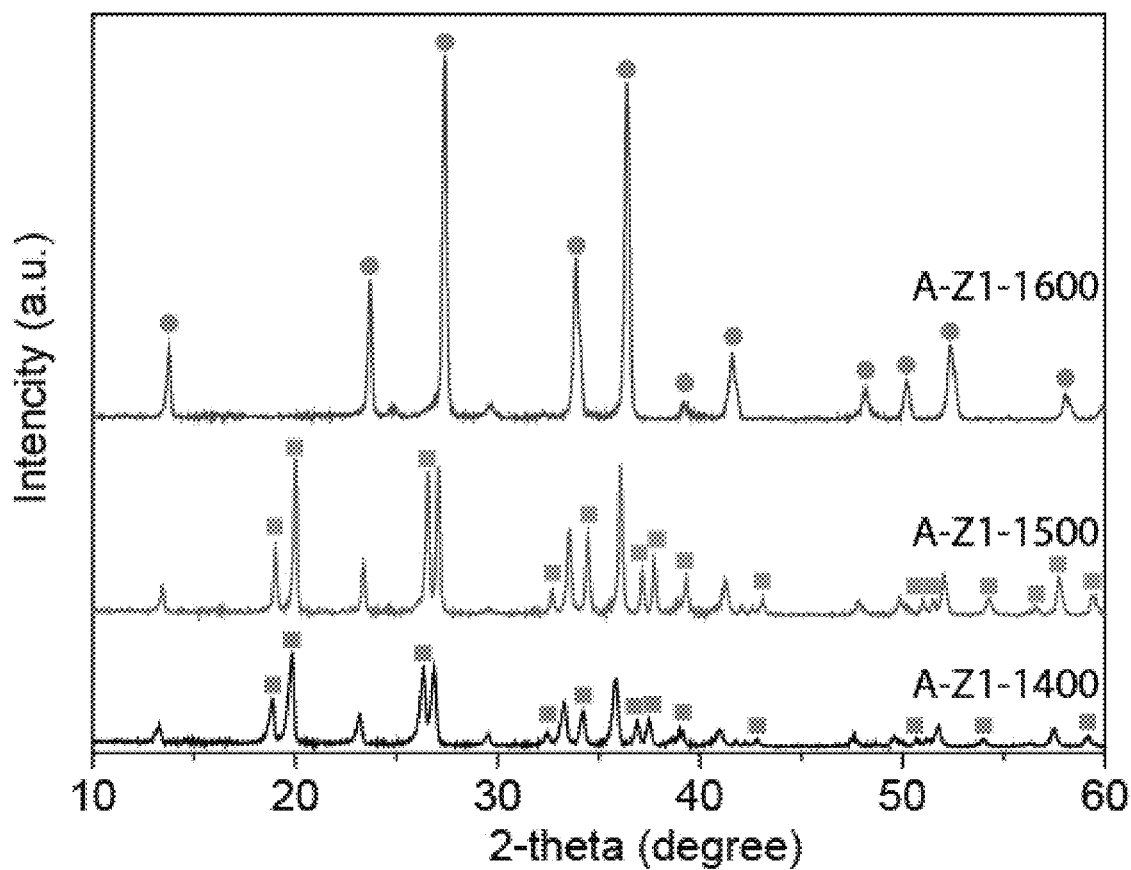
FIG. 6A shows XRD patterns of β-Sialon produced with the starting powder with amorphous $Si_3N_4$, Z=1, and at temperatures of 1400, 1500, and 1600° C.
Figure 6B:
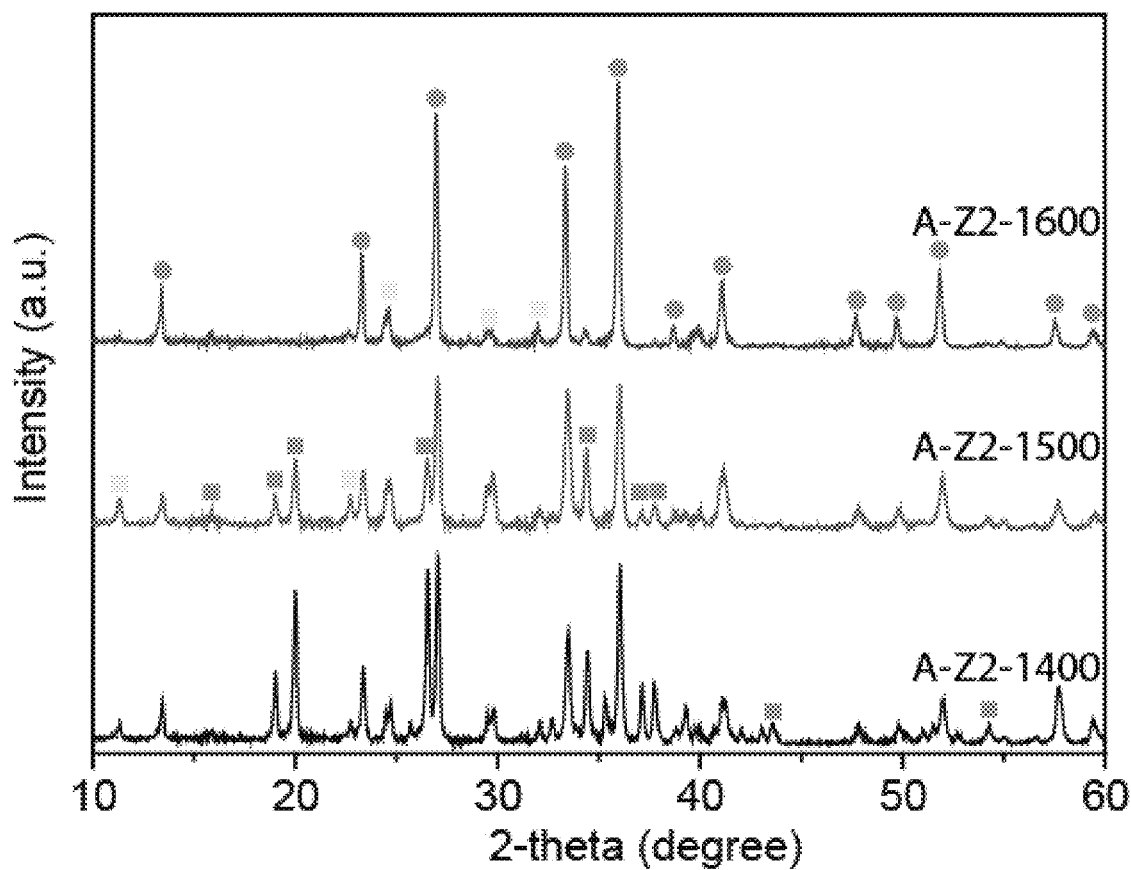
FIG. 6B shows XRD patterns of β-Sialon produced with the starting powder with amorphous $Si_3N_4$, Z=2, and at temperatures of 1400, 1500, and 1600° C.
Figure 6C:
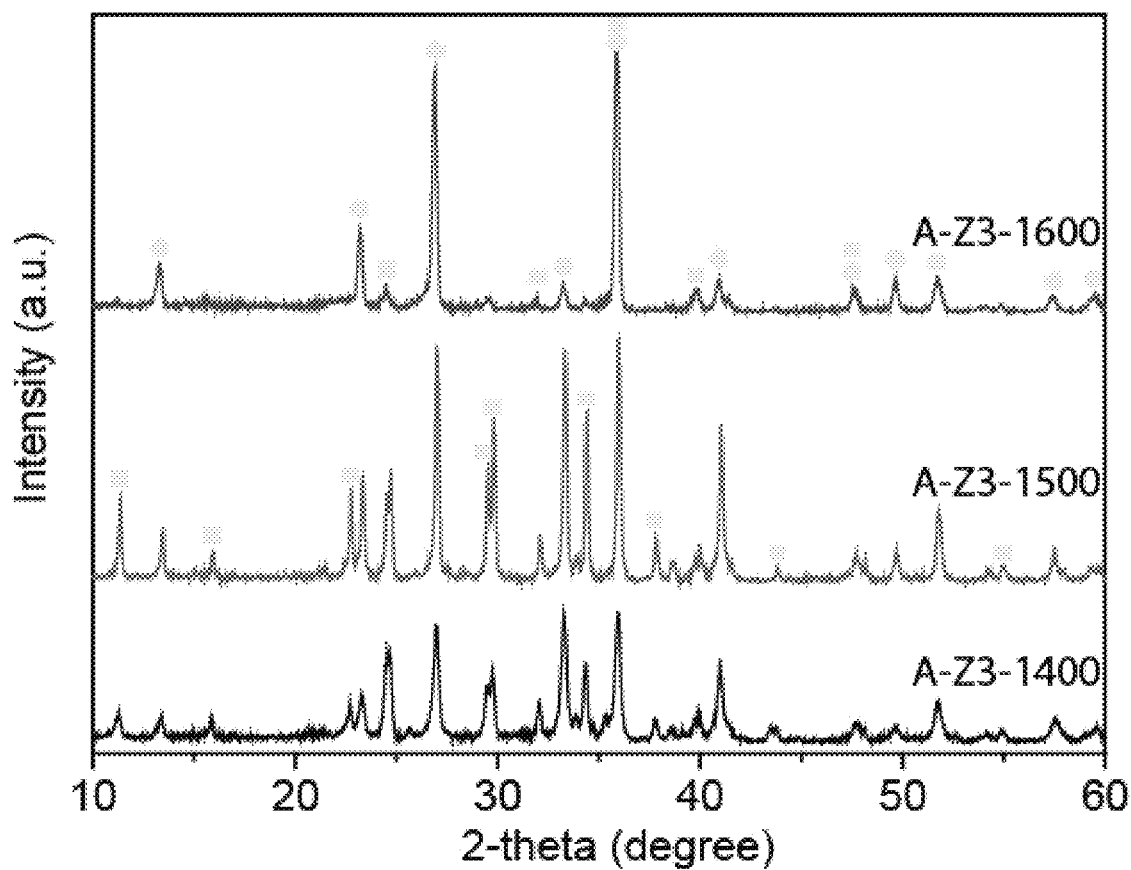
FIG. 6C shows XRD patterns of β-Sialon produced with the starting powder with amorphous $Si_3N_4$, Z=3, and at temperatures of 1400, 1500, and 1600° C.

FIGS. 6A-6C show the formation of the major β-Sialon phase in the samples, along with the minor phase(s). FIGS. 6A-6C present the XRD patterns for the β-Sialon samples synthesized using amorphous $Si_3N_4$ (20-40 nm). It was observed that higher synthesis temperatures resulted in less intense second-phase peaks in the XRD patterns. When the synthesis temperature was 1600° C., almost no second phase evolved, and the β-Sialon phase was observed as a major phase. The decrease in Vickers hardness value and the increase in the fracture toughness value for the samples synthesized at higher temperatures are attributed to the dissolution of intermediate phases with increasing temperature and to the evolution of elongated grains of a single β-Sialon phase, as shown in Table 3. From FIG. 6A, β-Sialon samples synthesized using amorphous $Si_3N_4$ (20-40 nm) have the same starting composition of the precursors. However, at reaction temperatures of 1400 and 1500° C., the evolution of the second-phase polytype AlN with two different compositions of $Si_{1.62}Al_{0.38}N_{1.62}O_{1.38}$ and $Si_{1.84}Al_{0.16}N_{1.84}O_{1.16}$ (ICDD: 01-088-2059 and 01-088-2058, respectively) was observed. From FIG. 6B, β-Sialon and polytype AlN (ICDD: 01-088-2058) are present in similar concentrations when synthesized at 1400° C.; however, another polytype of AlN (ICDD: 01-042-0165) was present in a much smaller concentration and phase turned into the second phase only in the samples with Z=3. A comparison of the XRD patterns of A-Z2-1500 and A-Z1-1400 reveals that polytype AlN (ICDD: 01-088-2058) decreased in concentration because it dissolved into the β-Sialon at 1500° C. and the β-Sialon concentration was increasing. At 1600° C., polytype AlN (ICDD: 01-088-2058) all dissolved into the β-Sialon. However, a very small trace of polytype AlN (ICDD: 01-042-0165) phase was present. From FIG. 6C, it was estimated that, as the temperature was increased, the concentration of the polytype (01-042-0165) phase decreased and that of the β-Sialon phase increased. Moreover, as the 'Z' value was changed from 1 to 3, the polytype AlN phase with a composition of $Si_{1.62}Al_{0.38}N_{1.62}O_{1.38}$ (ICDD: 01-088-2059) finally transformed into the polytype AlN phase with the composition of $Si_3Al_6N_{12}O_2$ (ICDD: 01-042-0165).

Figure 6D:
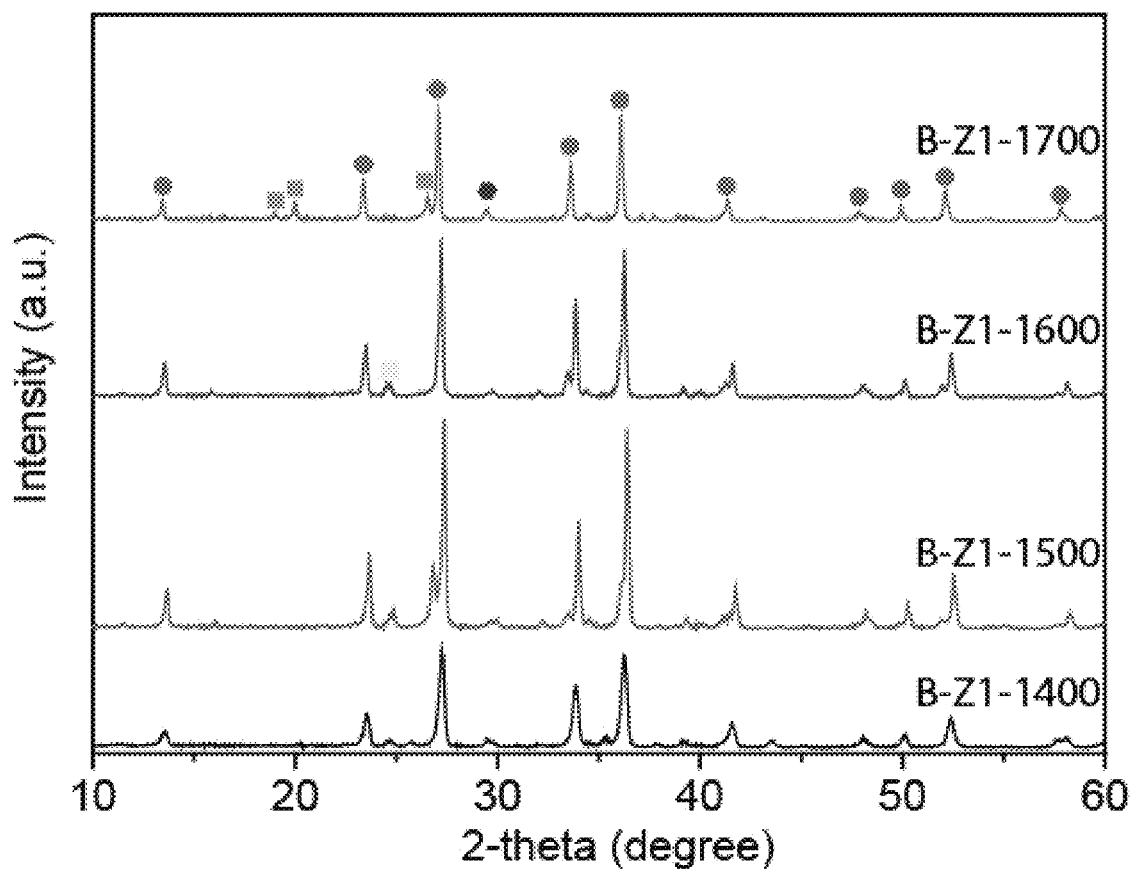
FIG. 6D shows XRD patterns of β-Sialon produced with the starting powder with β-$Si_3N_4$, Z=1, and at temperatures of 1400, 1500, 1600, and 1700° C.
Figure 6E:
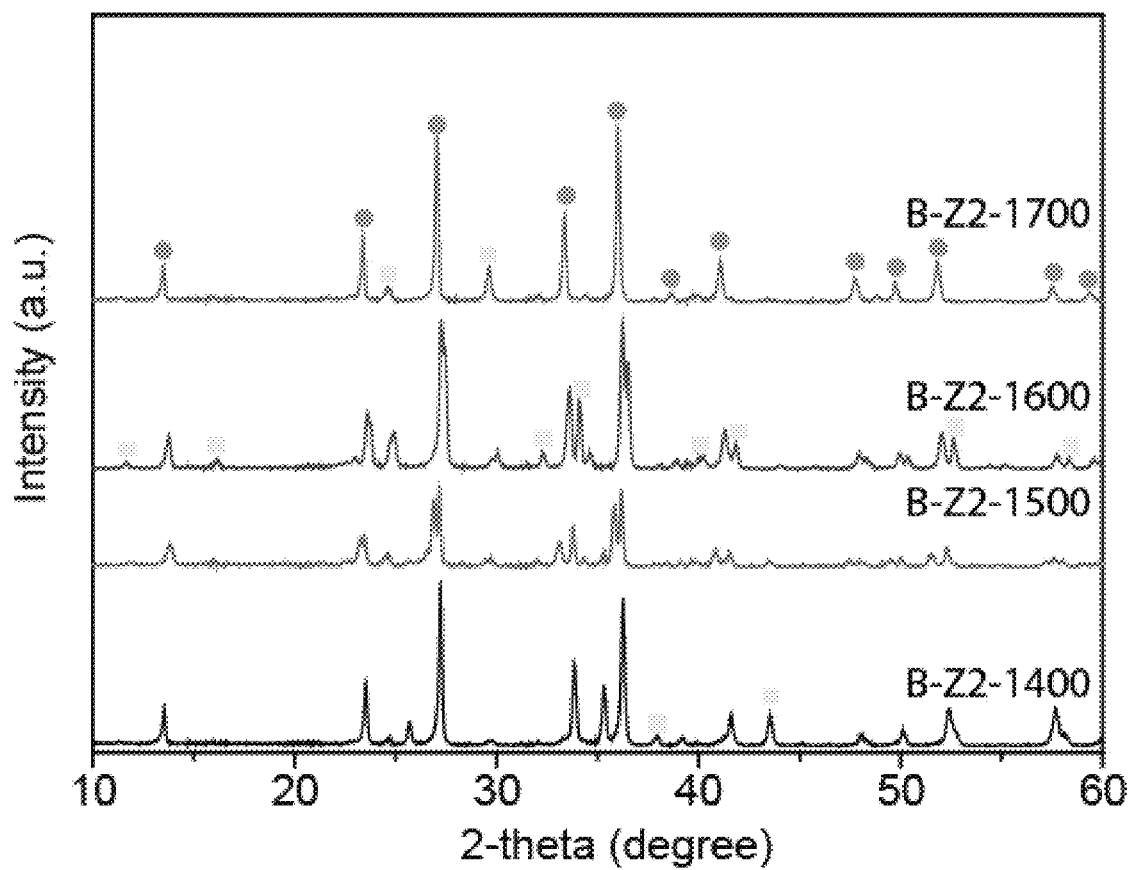
FIG. 6E shows XRD patterns of β-Sialon produced with the starting powder with β-$Si_3N_4$, Z=2, and at temperatures of 1400, 1500, 1600, and 1700° C.
Figures 6F, 6G:
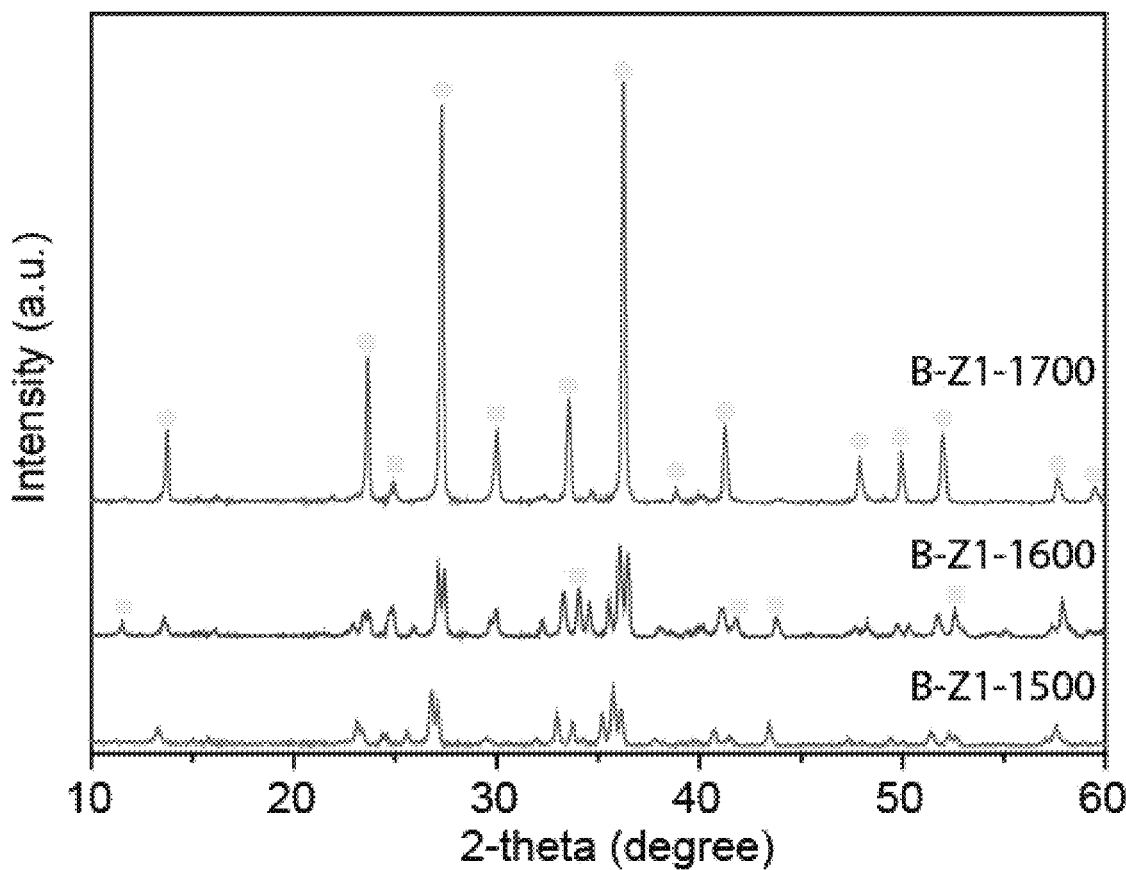
FIG. 6F shows XRD patterns of β-Sialon produced with the starting powder with β-$Si_3N_4$, Z=3, and at temperatures of 1500, 1600, and 1700° C.
FIG. 6G is a key to the marked XRD peaks of FIGS. 6A-6F.
Figure 7A:
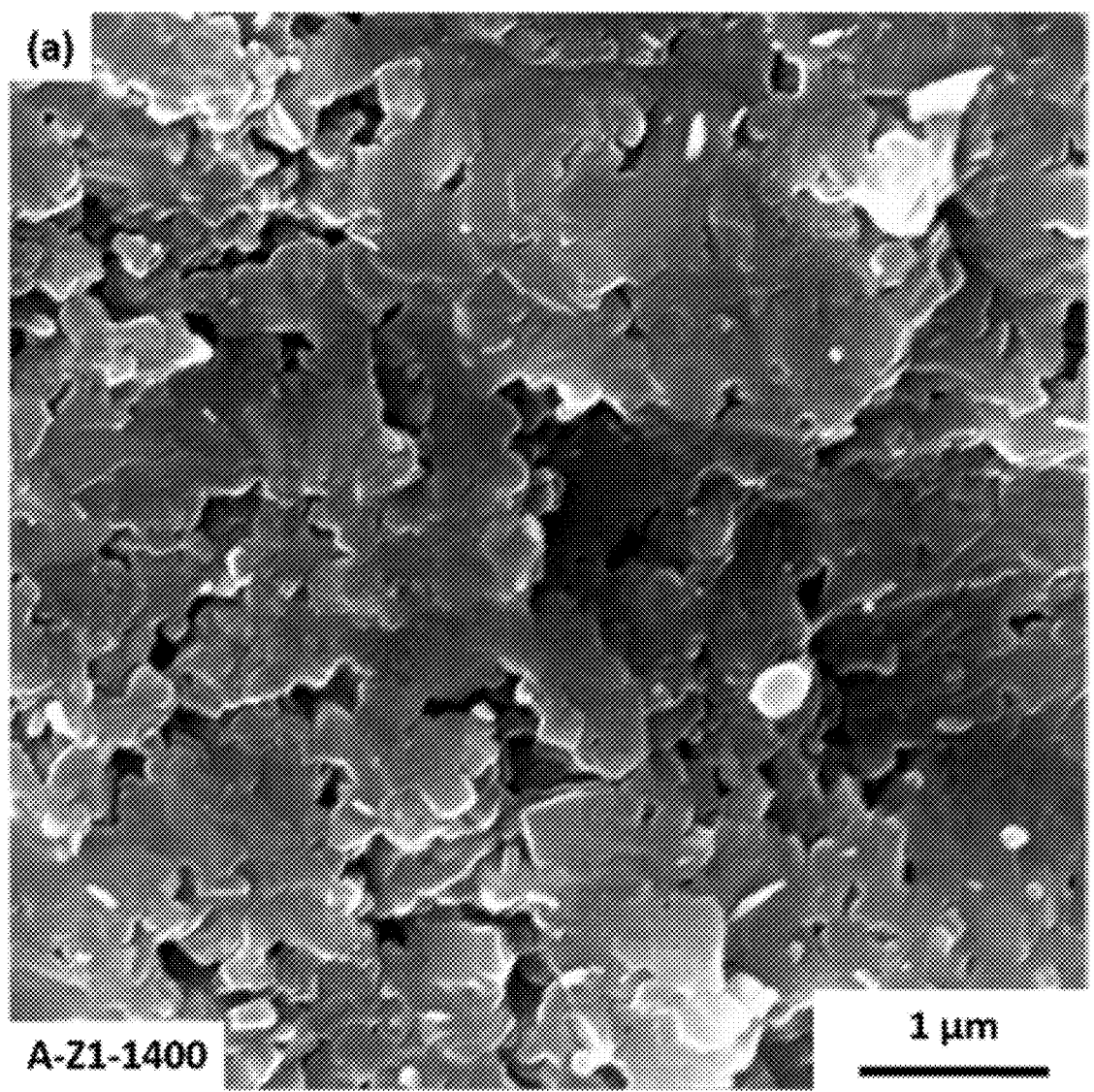
FIGS. 7A-7C are fracture-surface FESEM images of β-Sialon produced with the starting powder with amorphous $Si_3N_4$, Z=1, and at temperatures of 1400, 1500, and 1600° C., respectively.
Figure 7B:
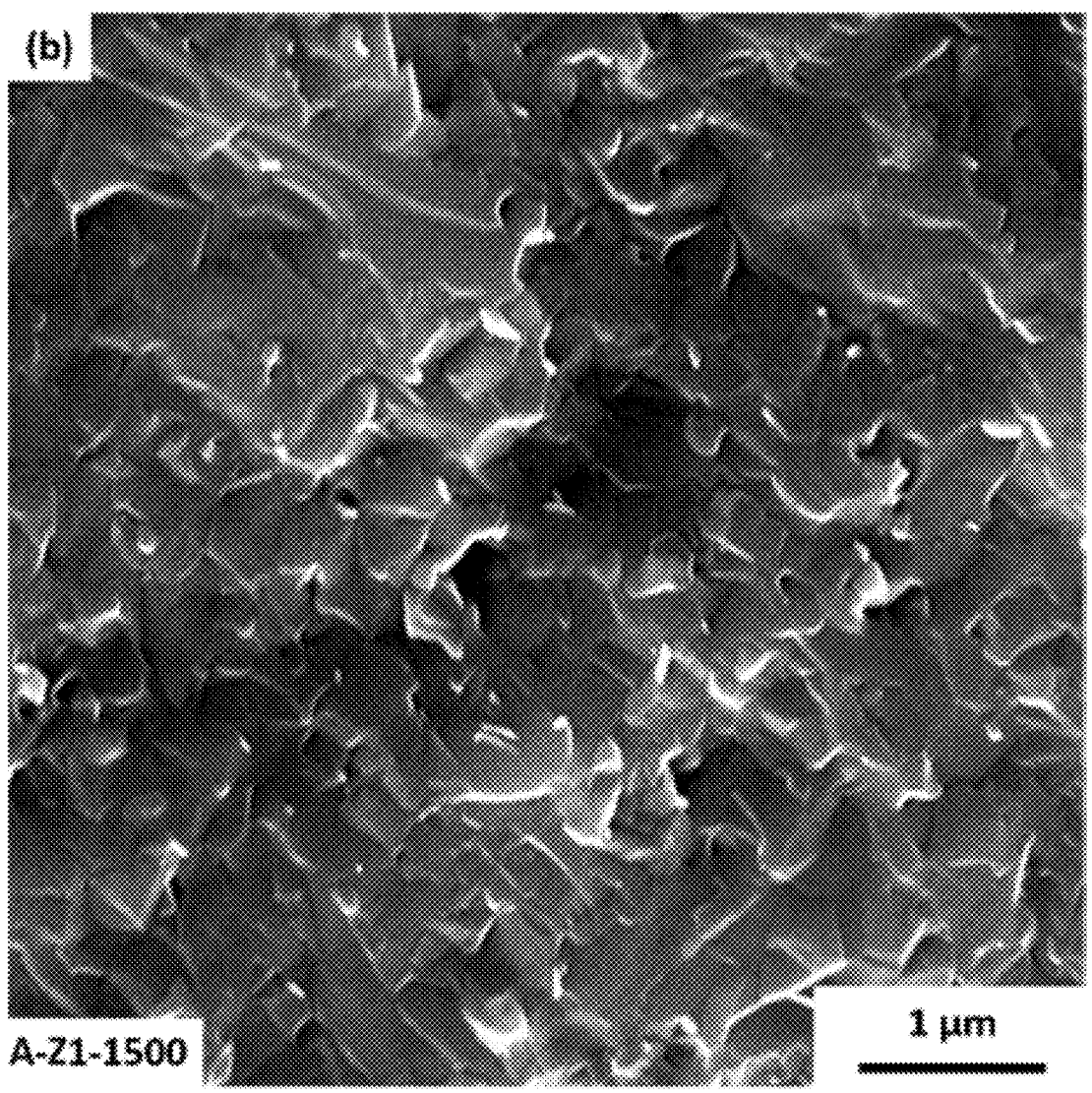
Figure 7C:
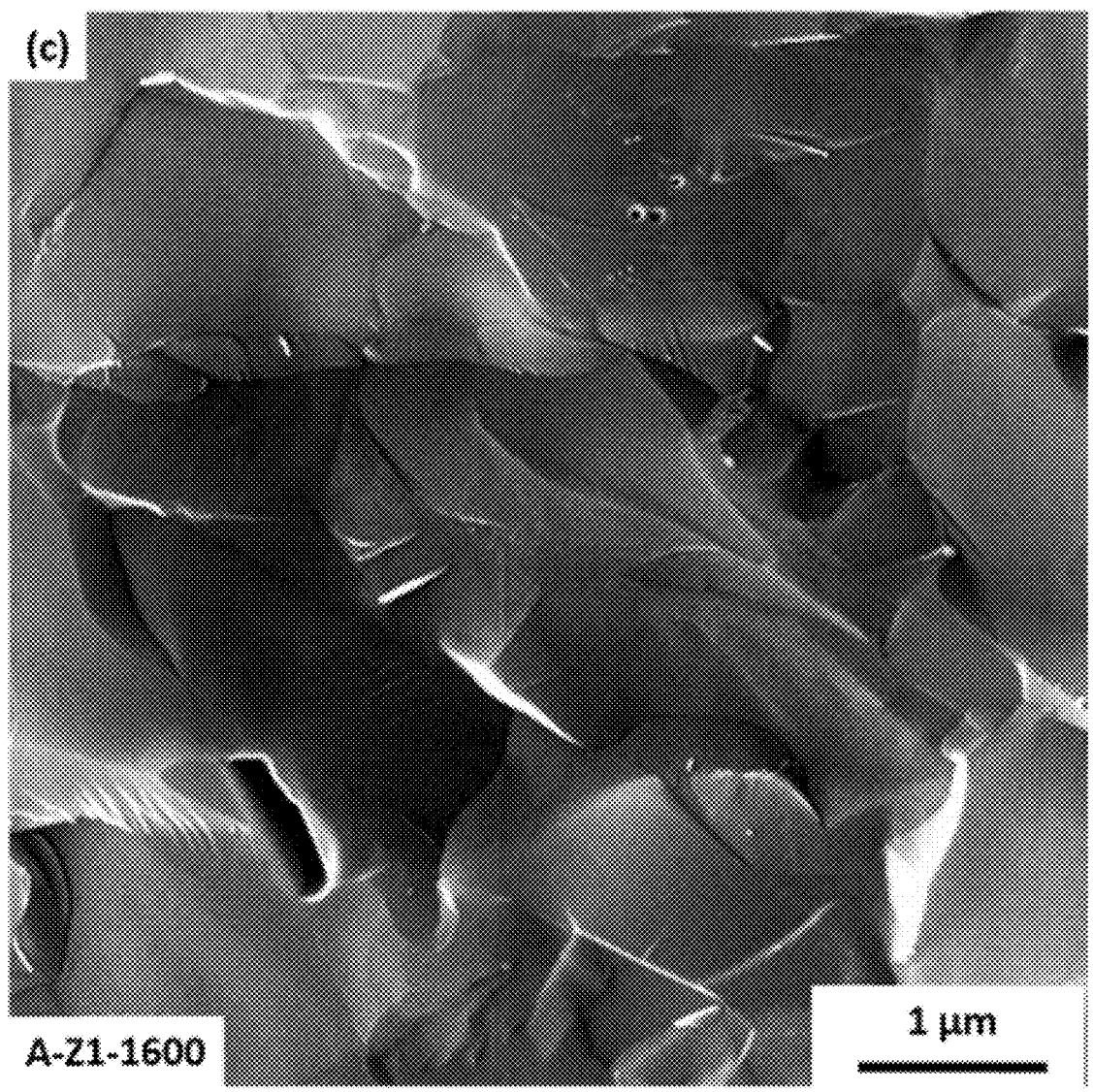
Figure 7D:
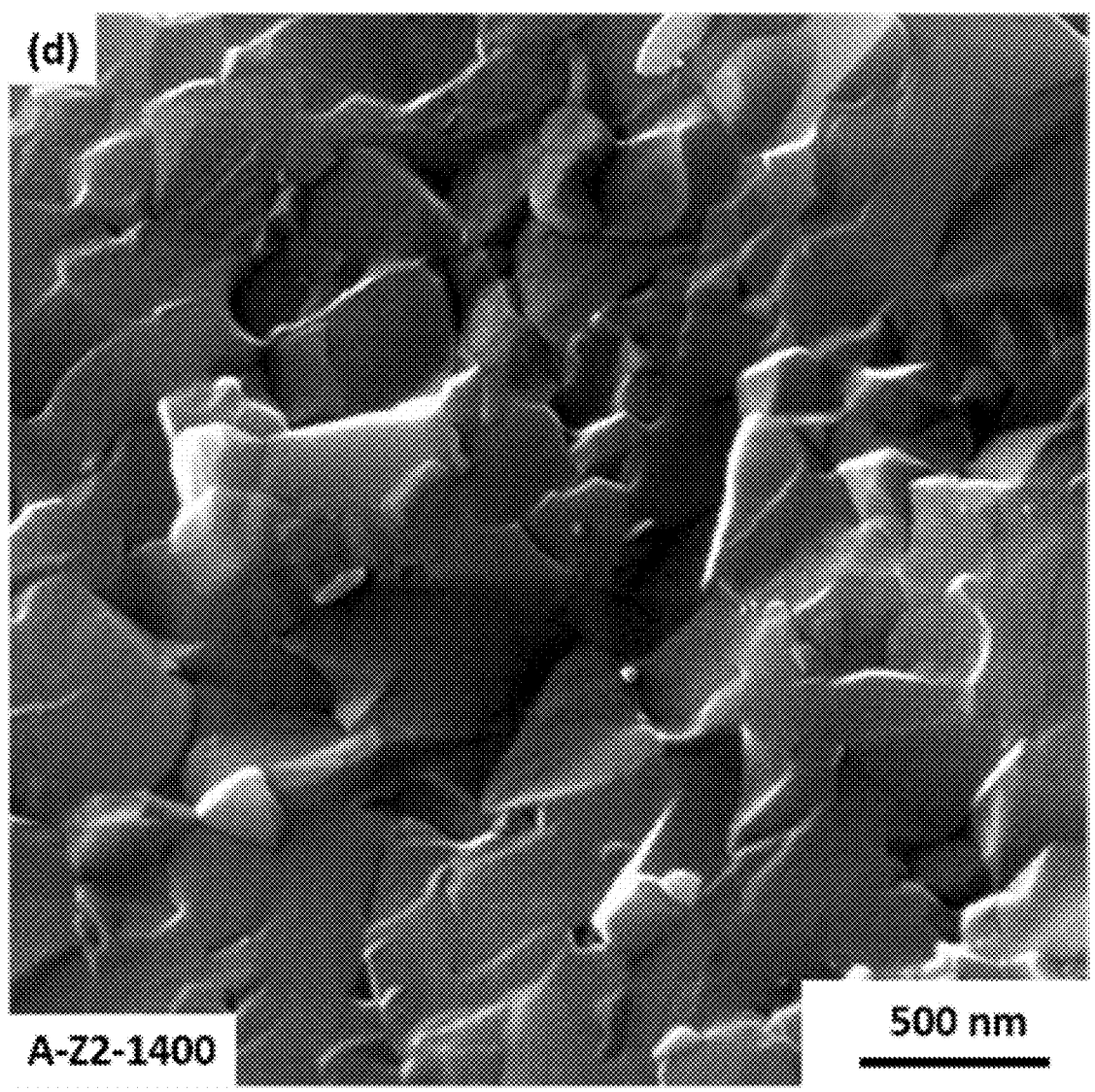
FIGS. 7D-7F are fracture-surface FESEM images of β-Sialon produced with the starting powder with amorphous $Si_3N_4$, Z=2, and at temperatures of 1400, 1500, and 1600° C., respectively.
Figure 7E:
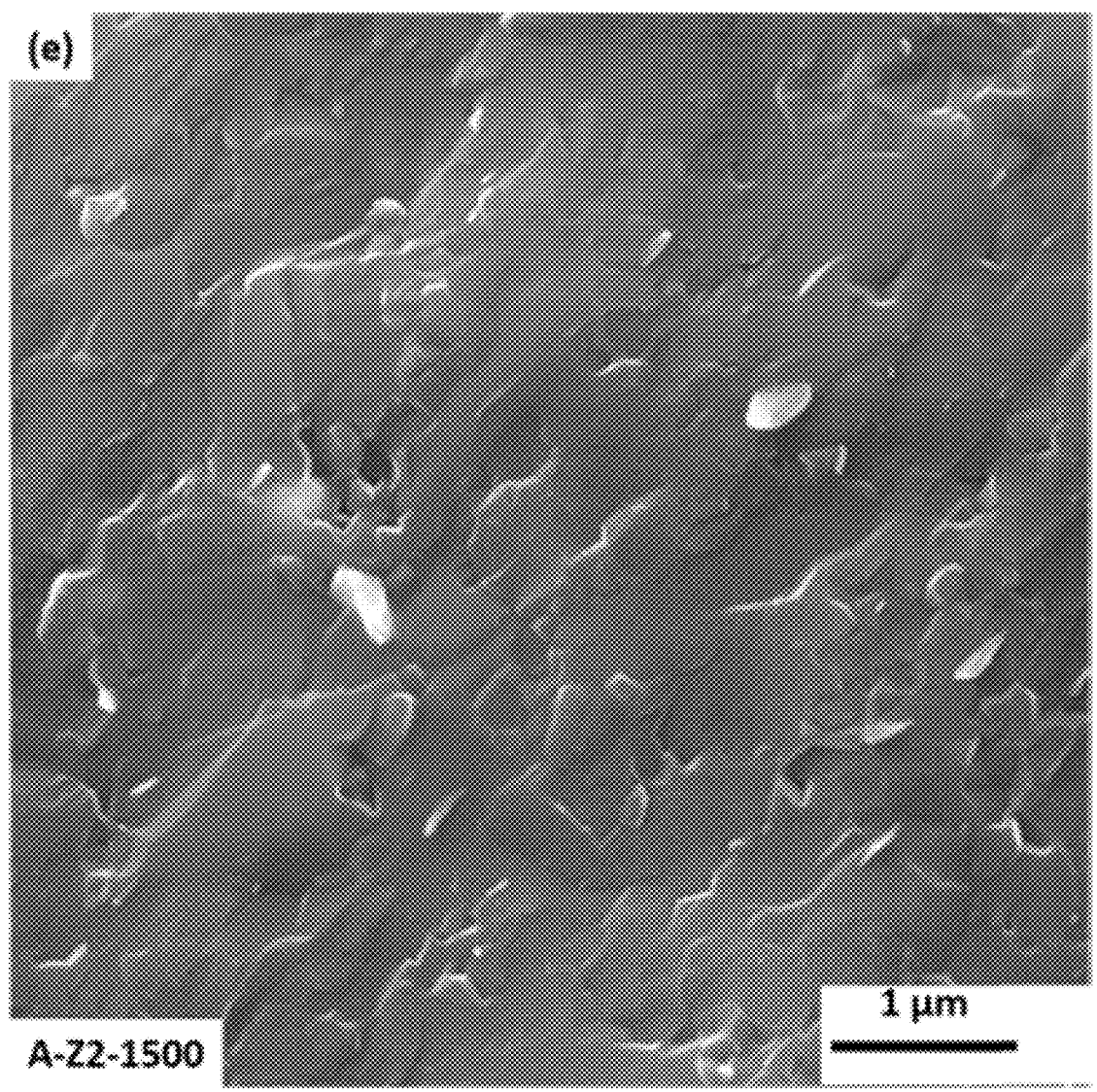
Figure 7F:
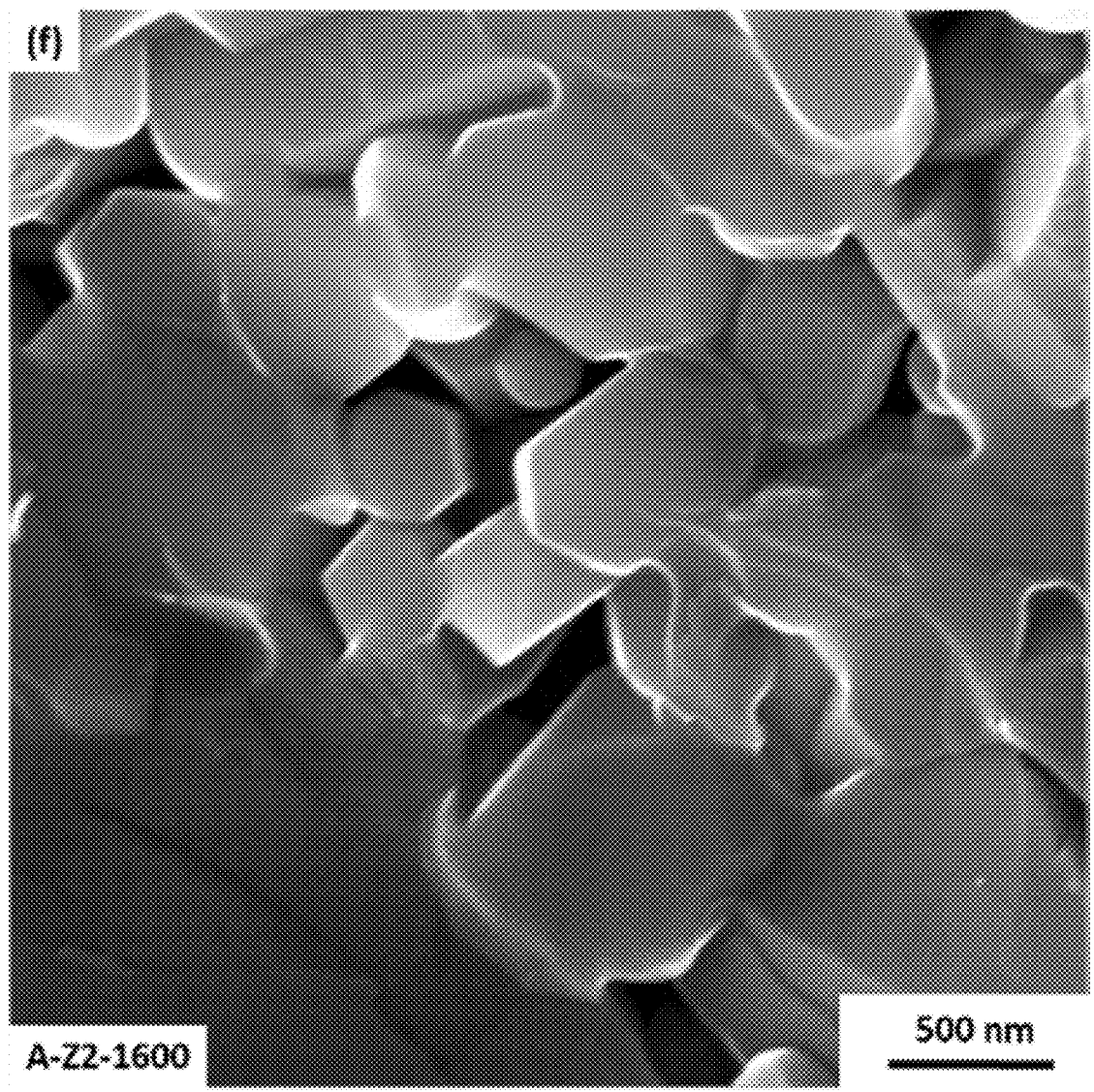
Figure 7G:
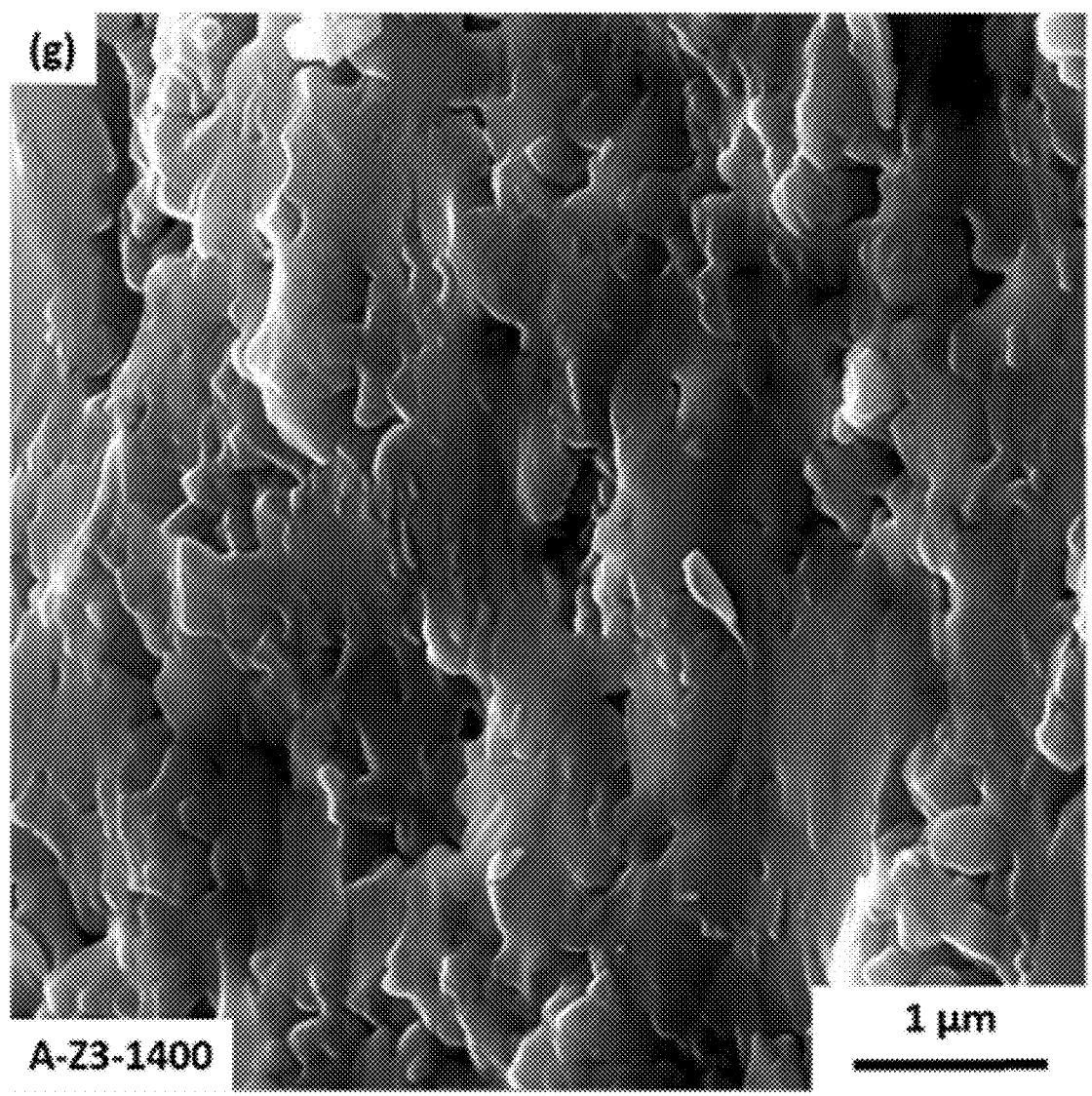
FIGS. 7G-7I are fracture-surface FESEM images of β-Sialon produced with the starting powder with amorphous $Si_3N_4$, Z=3, and at temperatures of 1400, 1500, and 1600° C., respectively.
Figure 7H:
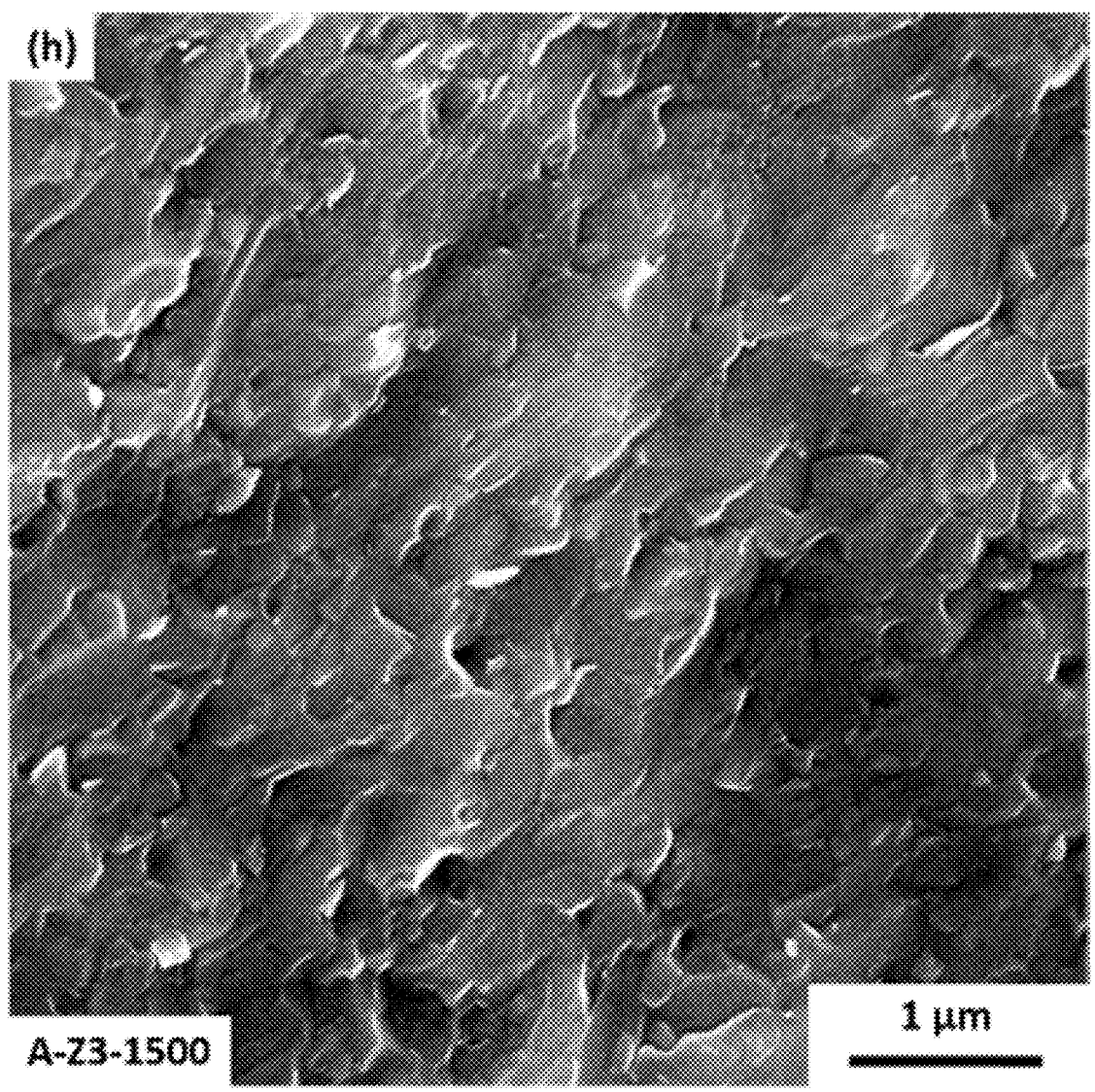
Figure 7I:
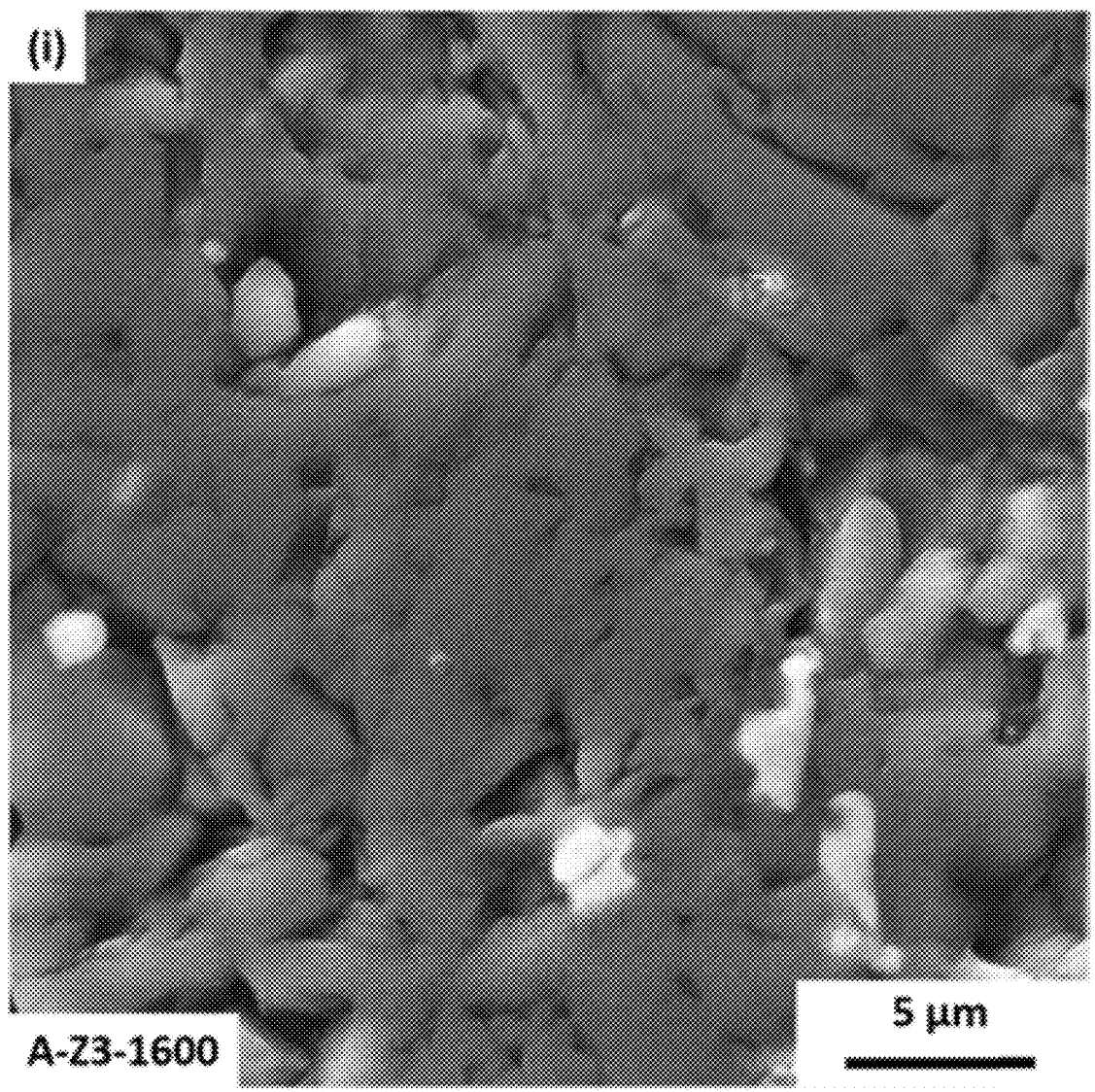
Figure 8A:
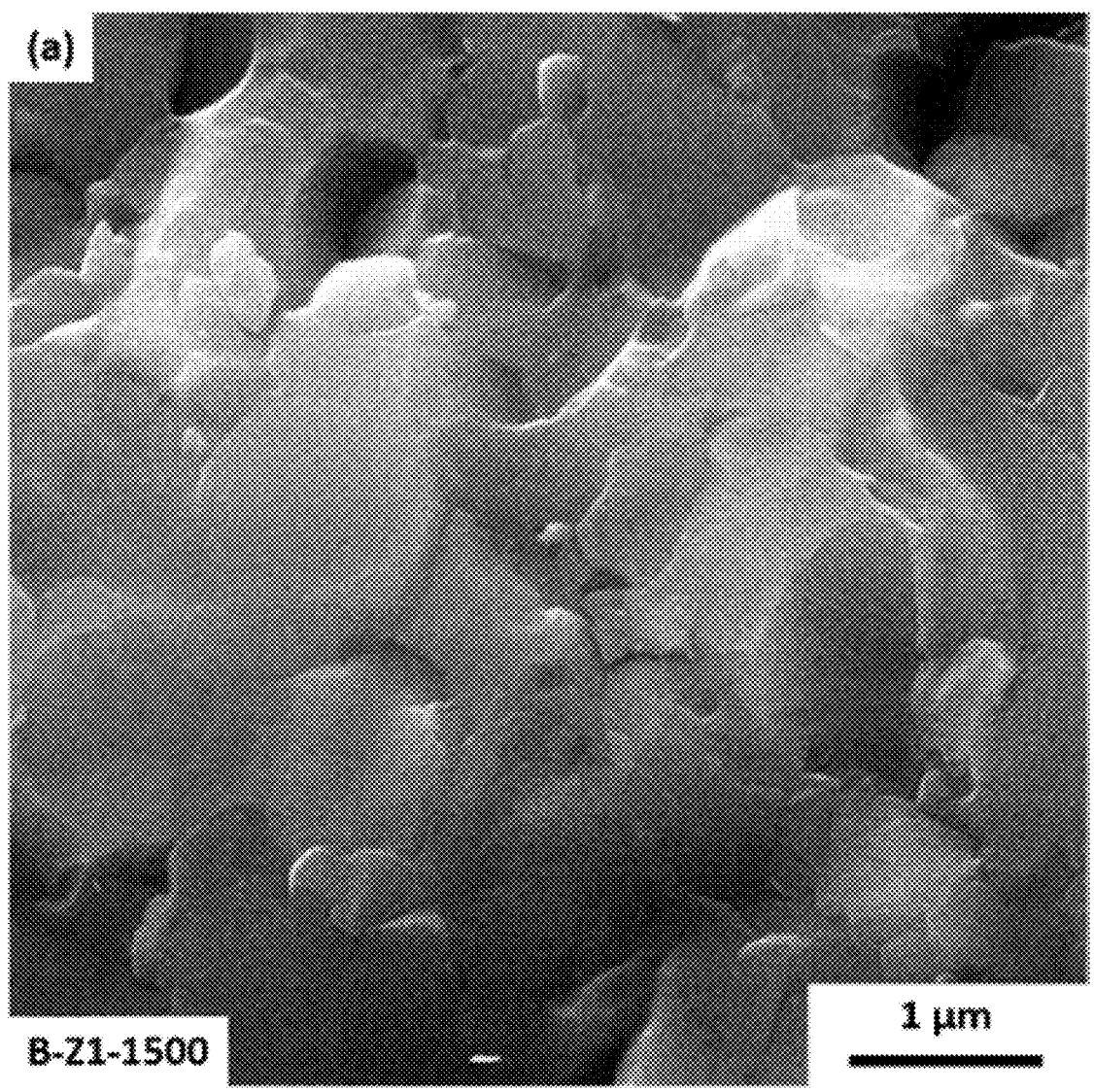
FIGS. 8A-8C are fracture-surface FESEM images of β-Sialon produced with the starting powder with the starting powder with β-$Si_3N_4$, Z=1, and at temperatures of 1500, 1600, and 1700° C., respectively.
Figure 8B:
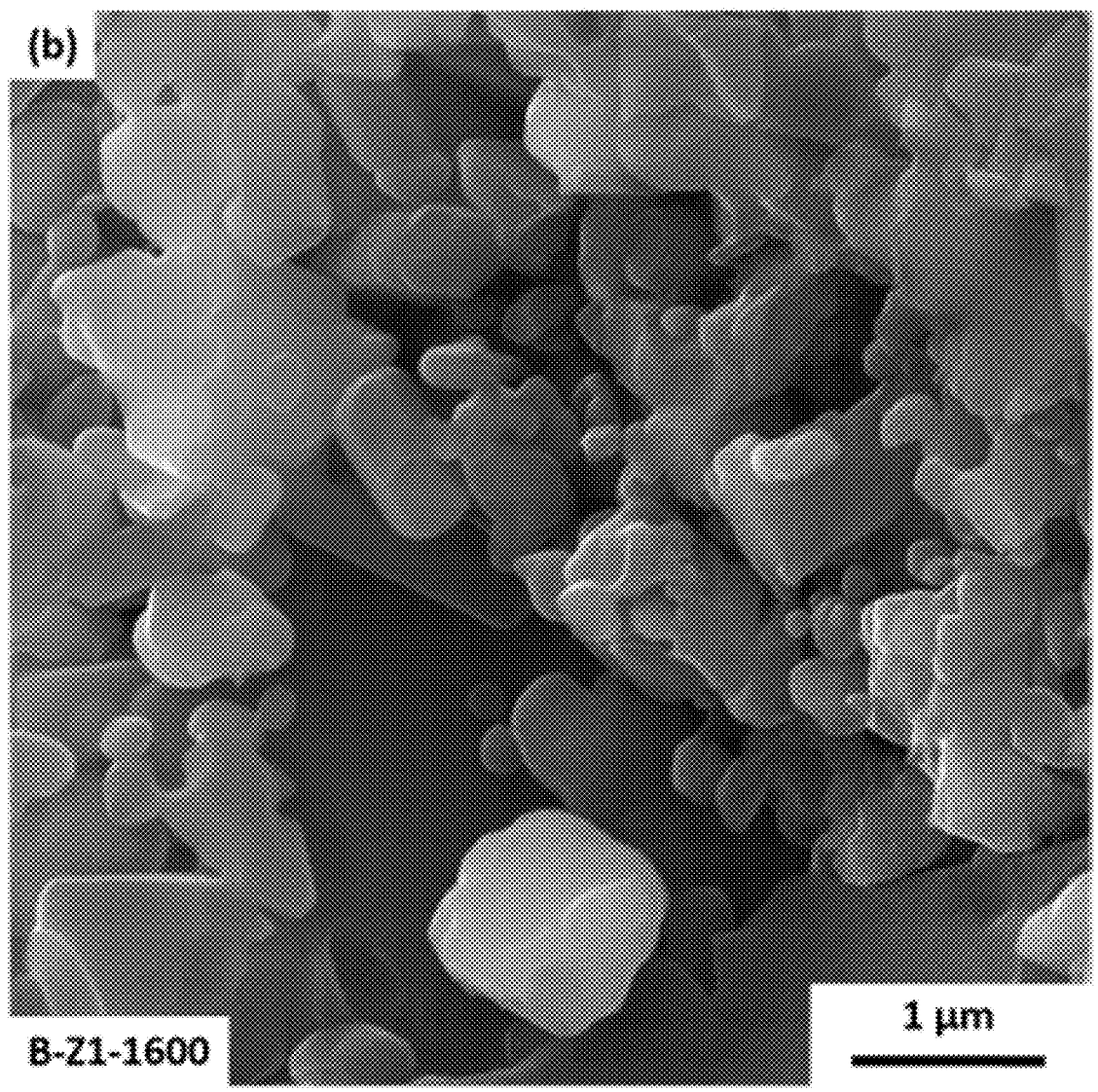
Figure 8C:
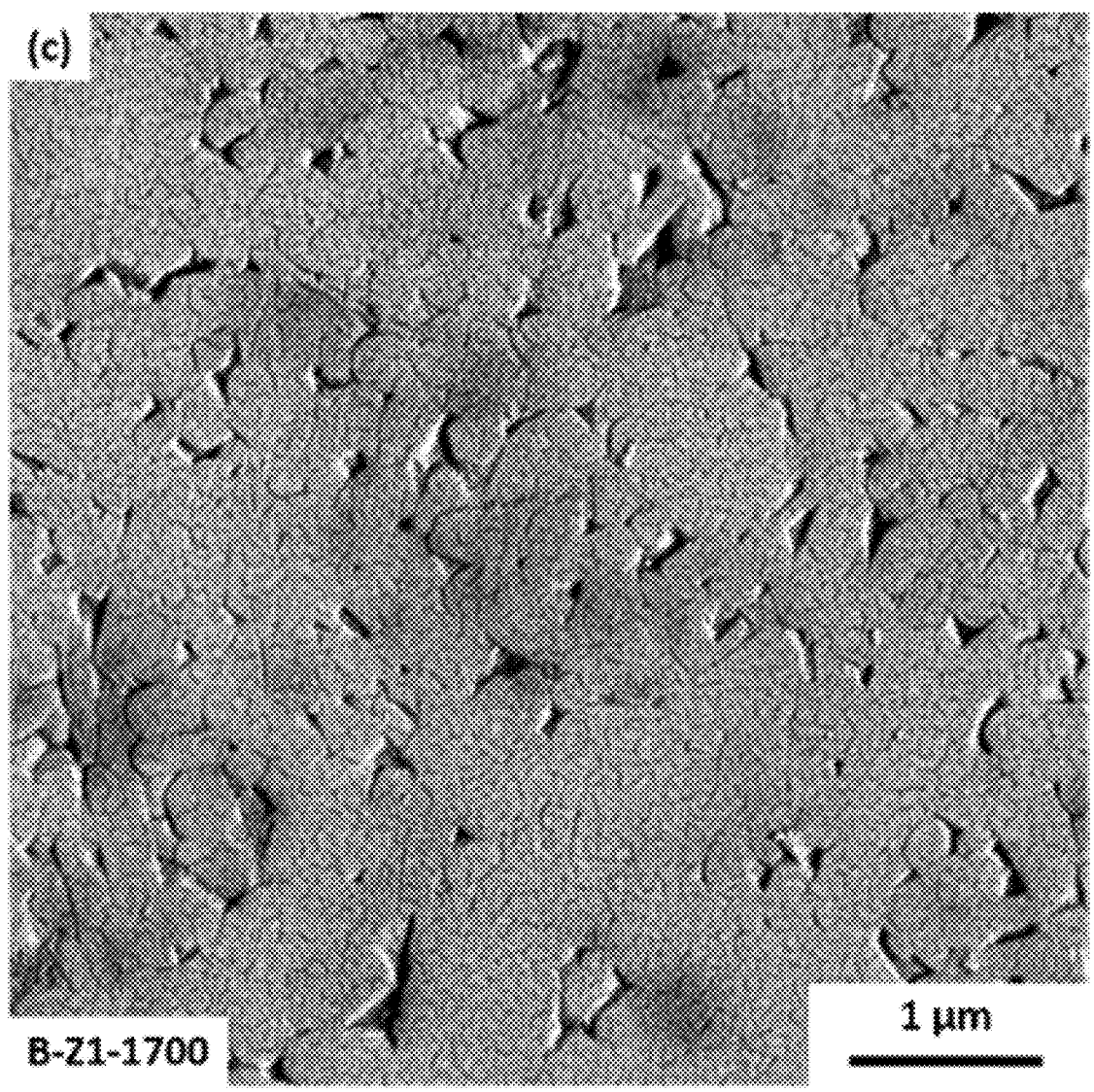
Figure 8D:
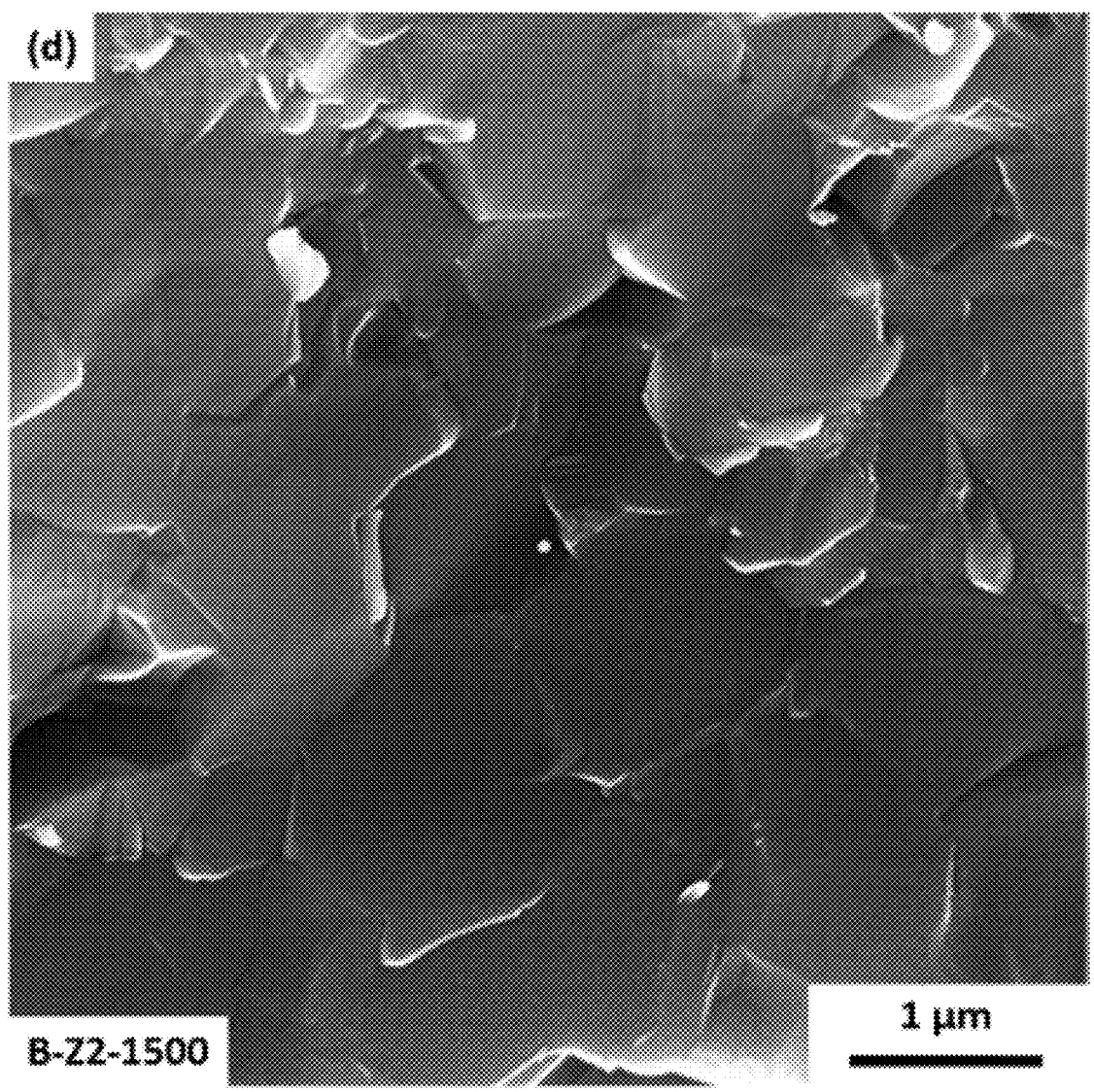
FIGS. 8D-8F are fracture-surface FESEM images of β-Sialon produced with the starting powder with the starting powder with β-$Si_3N_4$, Z=2, and at temperatures of 1500, 1600, and 1700° C., respectively.
Figure 8E:
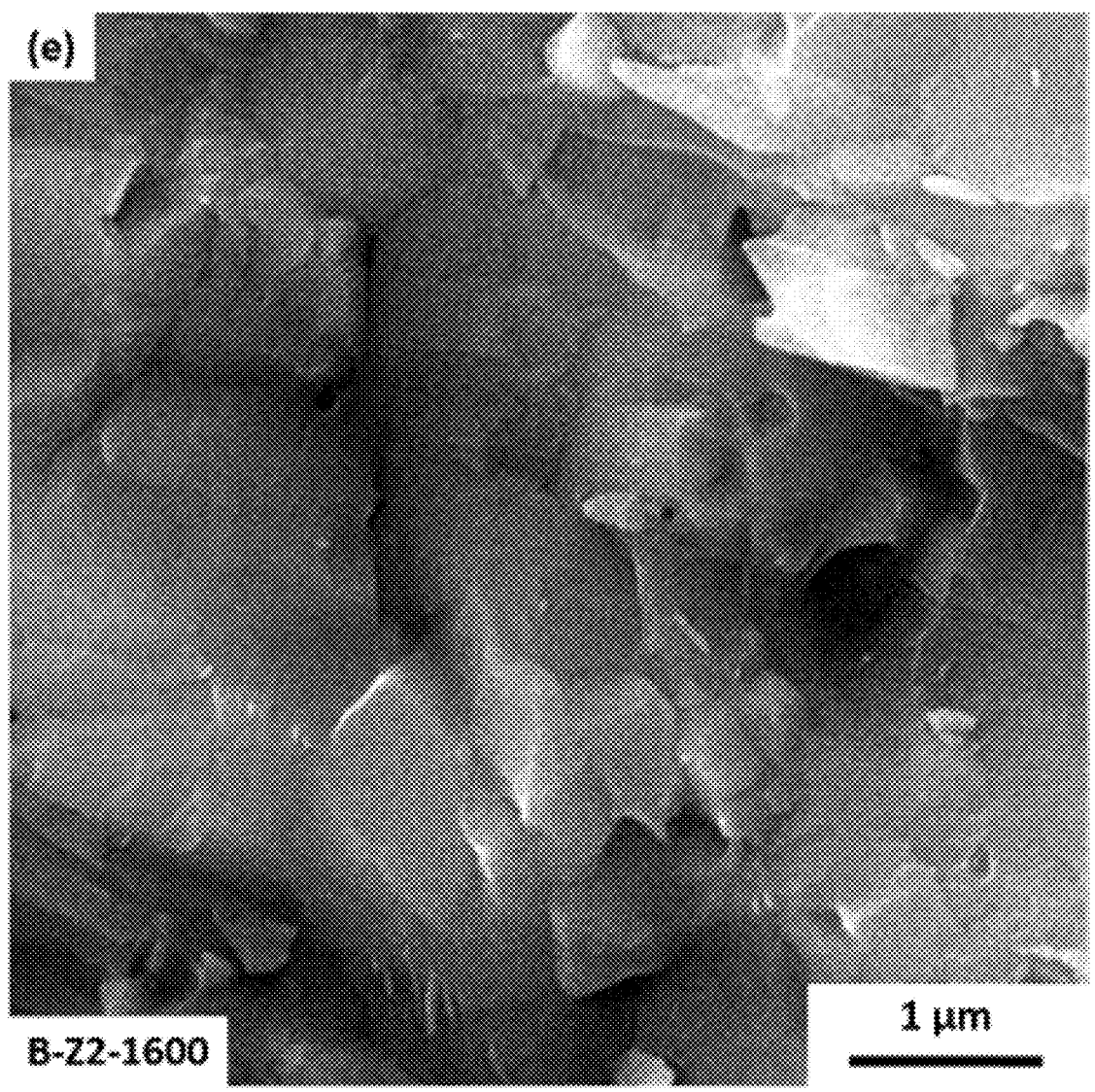
Figure 8F:
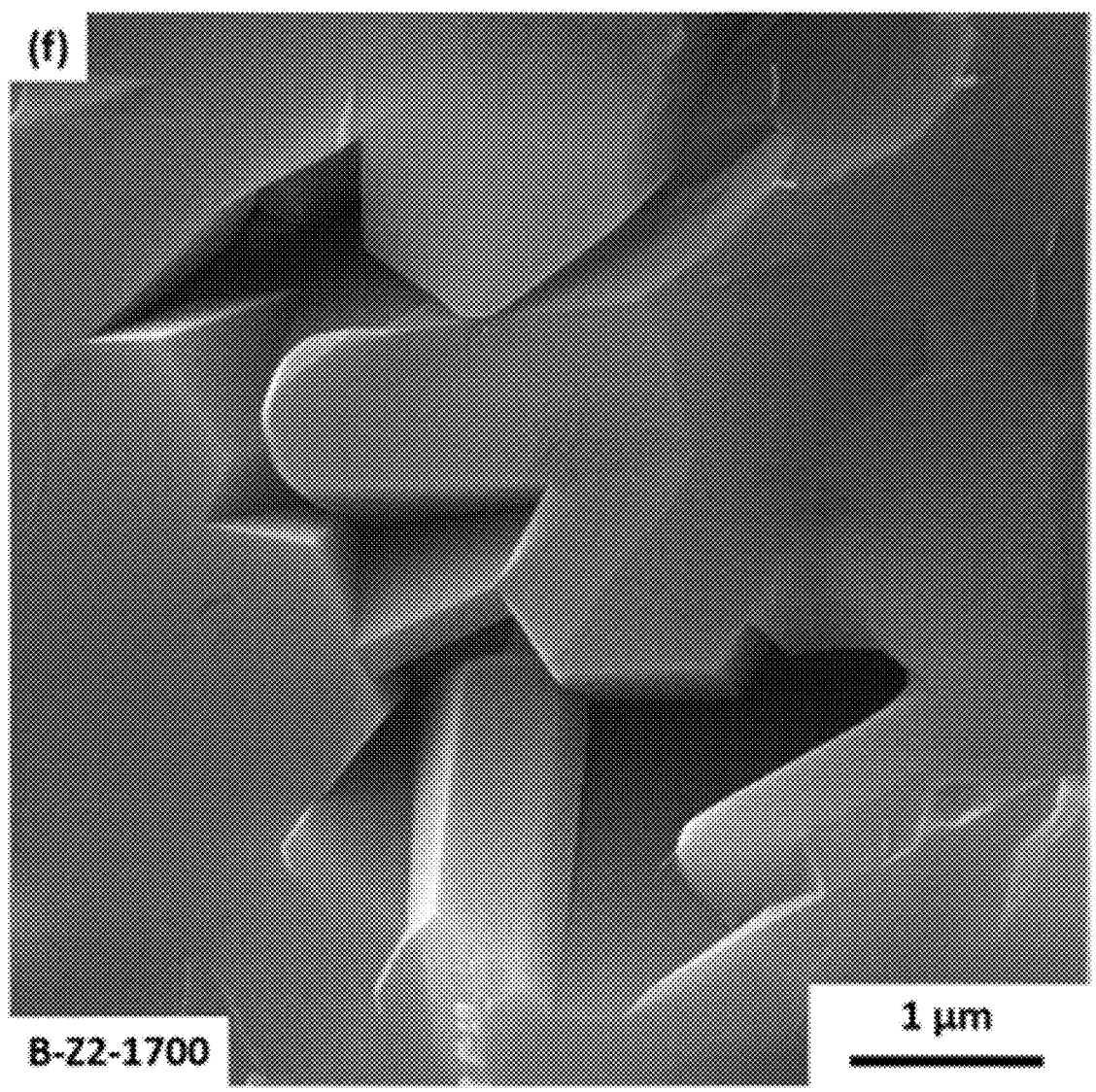
Figure 8G:
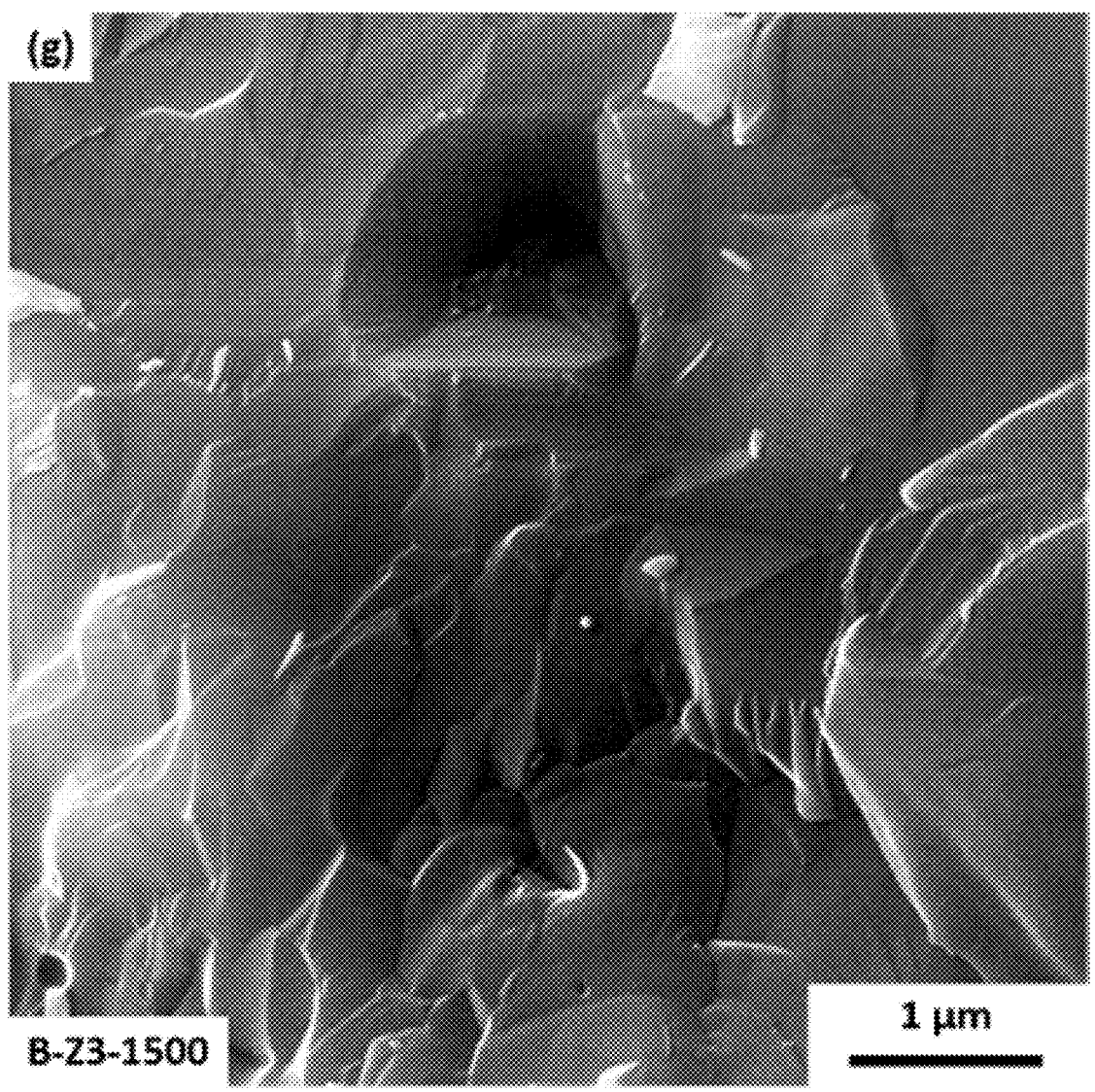
FIGS. 8G-8I are fracture-surface FESEM images of β-Sialon produced with the starting powder with the starting powder with β-$Si_3N_4$, Z=3, and at temperatures of 1500, 1600, and 1700° C., respectively.
Figure 8H:
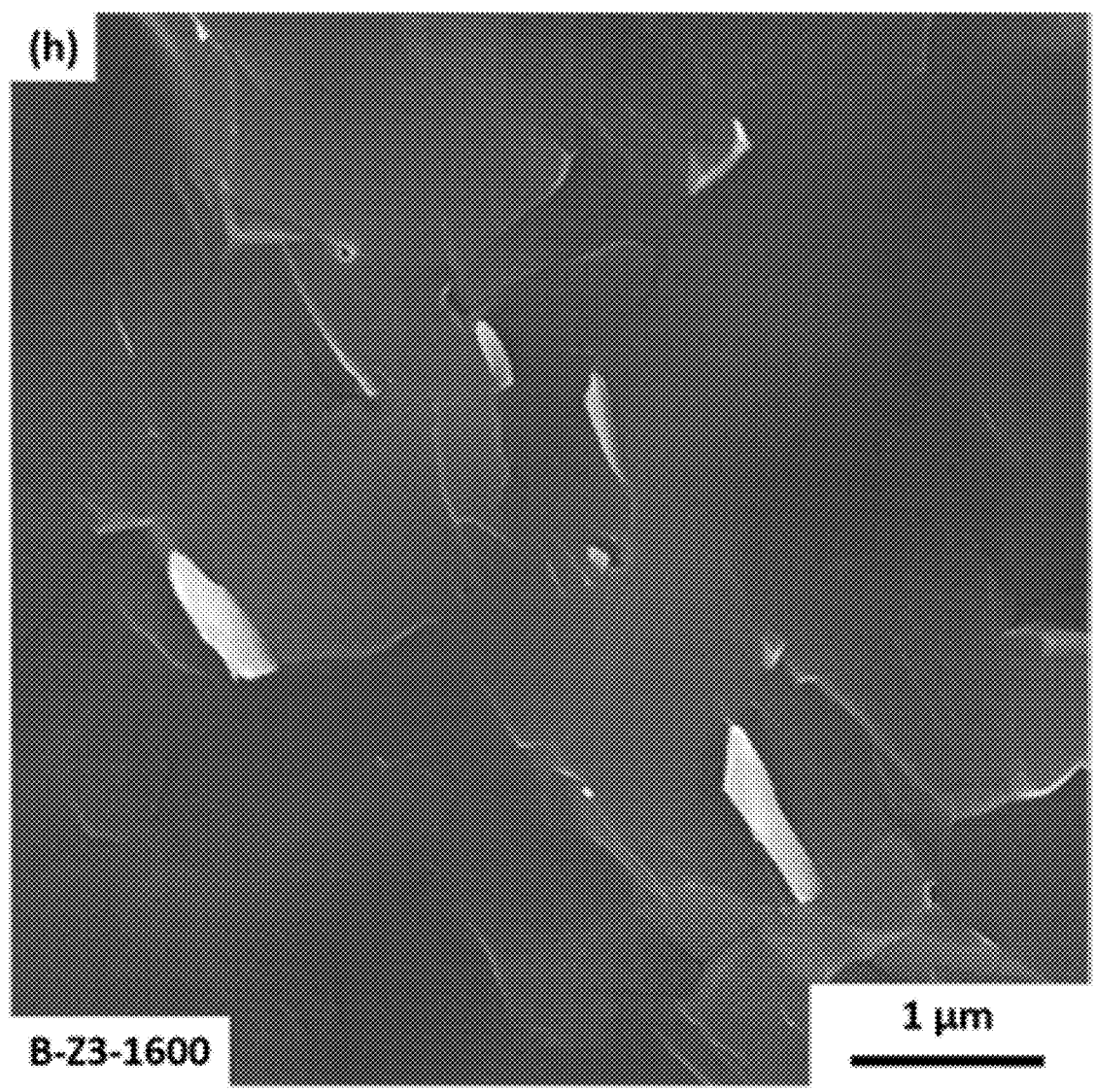
Figure 8I:
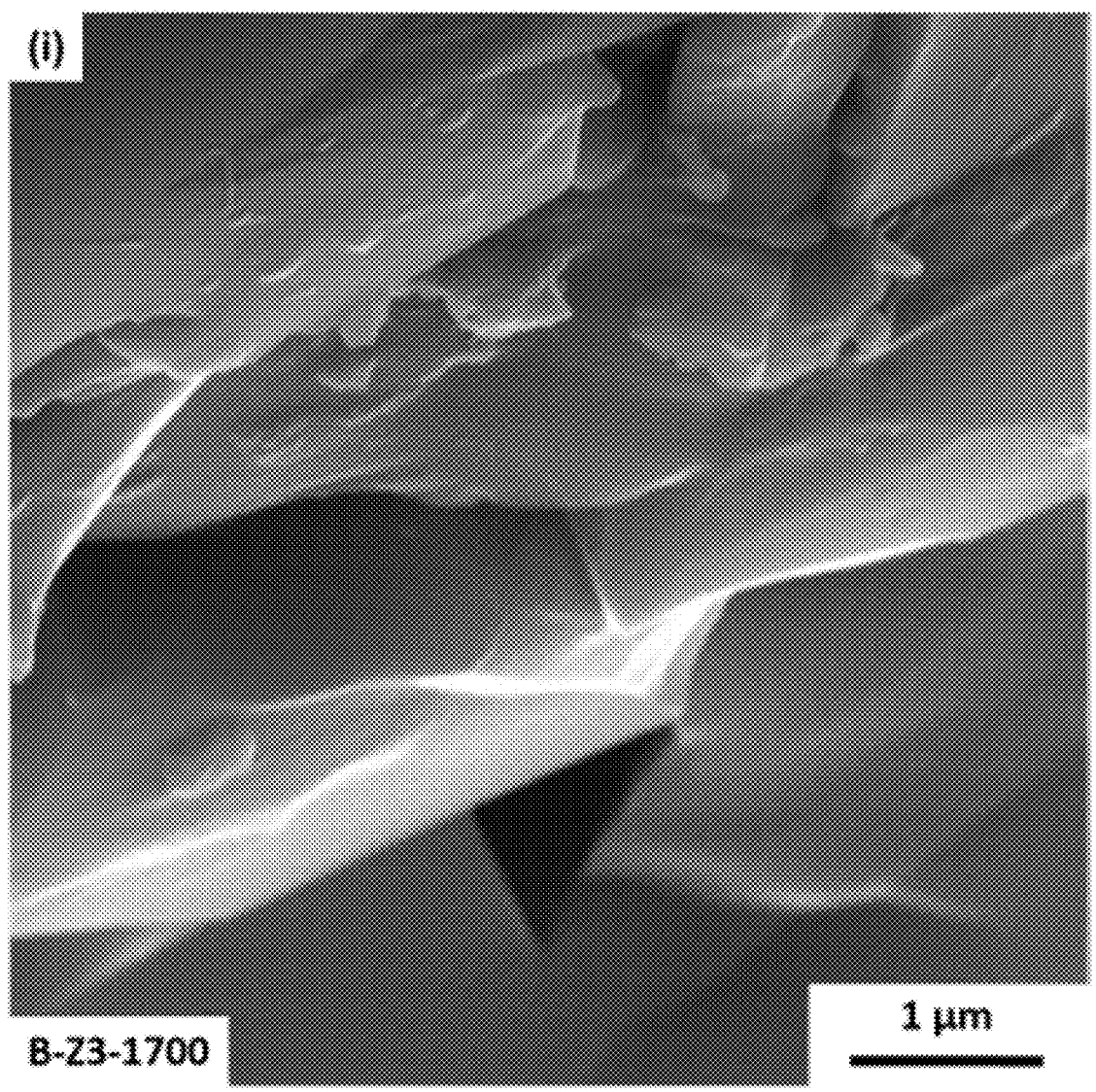

FIGS. 6D-6F show a similar trend for the β-Sialon samples synthesized using microsized β-$Si_3N_4$ (44 μm). Clearly, as the Z value was varied from 1 to 3, the AlN polytype with the composition $Si_{1.84}Al_{0.16}N_{1.84}O_{1.16}$ (ICDD: 01-088-2058) gradually transformed into the AlN-polytype phase with a composition of $Si_3Al_6N_{12}O_2$ (ICDD: 01-042-0165). Meanwhile, at a higher synthesis temperature, the AlN polytype phase almost totally dissolved into β-Sialon. The XRD spectra of all of the samples collectively show that, at higher Z values, the AlN polytype with a composition of $Si_3Al_6N_{12}O_2$ (ICDD: 01-042-0165) was the stable second phase and that, as the synthesis temperature was increased, the amount of the second phase decreased at the expense of the major β-Sialon phase.

EXAMPLE 3

Results and Discussion—Density, Mechanical Properties, and Thermal Properties of the SPSed Samples Table 3 shows the density, Vickers hardness ($HV_{10}$), fracture toughness ($K_{Ic}$), thermal expansion coefficient values, and XRD phases for the β-Sialon samples (Z=1, 2, and 3) synthesized at 1400, 1500, and 1600° C. using amorphous $Si_3N_4$. The density was observed to increase as the synthesis temperature was increased from 1400 to 1600° C. for the same Z value. The Vickers hardness of the samples decreased with increasing synthesis temperature for the same Z values, and the Vickers hardness value decreased with increasing Z value for the same synthesis temperature. Dissolution of the AlN polytype phase at higher temperatures and the formation of coarser and more elongated grains was attributed to the decrease in Vickers hardness. The fracture toughness values were in the range 3.3-4.6 MPa·m$^{1/2}$. The sample with Z=1 and a synthesis temperature of 1500° C. resulted in the highest Vickers hardness value of 19.24 GPa. The Vickers hardness value was far higher than the reported value of 17.6 GPa. See X. Yi, K. Watanabe, and T. Akiyama, "Preparation of β-$Si_{6-z}Al_zO_zN_{8-z}$ (z=1–3) by combustion synthesis," *IOP Conf. Ser. Mater. Sci. Eng.*, vol. 18, no. 7, p. 072004, May 2011. The thermal expansion coefficients among the samples synthesized using the amorphous $Si_3N_4$ powder were measured to be in the range 1.9-2.6 ppm*$K^{-1}$.

TABLE 3

Characteristics of the β-Sialon prepared by SPS using the amorphous $Si_3N_4$ precursor.

| Sample ID | Density ($g/cm^3$) | Vickers Hardness, $Hv_{10}$ (GPa) | Fracture Toughness, $K_{Ic}$ ($MPa \cdot m^{1/2}$) | Thermal Expansion Coefficient (ppm * $K^{-1}$) | XRD Phases |
|---|---|---|---|---|---|
| A-Z1-1400 | 2.91(3) | 18.2(3) | 3.8(6) | 1.95 | β-Sialon ($Si_5AlON_7$), AlN Polytype ($Si_{1.62}Al_{0.38}N_{1.62}O_{1.38}$) |
| A-Z1-1500 | 2.93(2) | 19.2(4) | 4.2(7) | 2.29 | β-Sialon ($Si_5AlON_7$), AlN Polytype ($Si_{1.84}Al_{0.16}N_{1.84}O_{1.16}$) |
| A-Z1-1600 | 3.09(1) | 13.8(2) | 4.6(5) | 2.12 | β-Sialon ($Si_5AlON_7$) |
| A-Z2-1400 | 3.00(1) | 16.2(9) | 4.4(5) | 2.37 | β-Sialon ($Si_4Al_2O_2N_6$), AlN Polytype ($Si_{1.84}Al_{0.16}N_{1.84}O_{1.16}$) |
| A-Z2-1500 | 3.05(1) | 13.9(4) | 4.0(9) | 2.12 | β-Sialon ($Si_4Al_2O_2N_6$), AlN Polytype ($Si_{1.84}Al_{0.16}N_{1.84}O_{1.16}$ and $Si_3Al_6N_{12}O_2$) |
| A-Z2-1600 | 3.03(1) | 13.5(1) | 3.5(1) | 2.59 | β-Sialon ($Si_4Al_2O_2N_6$), AlN Polytype ($Si_3Al_6N_{12}O_2$) |
| A-Z3-1400 | 2.94(2) | 12.3(7) | 3.3(9) | 2.73 | β-Sialon ($Si_3Al_3O_3N_5$), AlN Polytype ($Si_3Al_6N_{12}O_2$) |
| A-Z3-1500 | 3.08(1) | 13.7(5) | 4.2(9) | 2.28 | β-Sialon ($Si_3Al_3O_3N_5$), AlN Polytype ($Si_3Al_6N_{12}O_2$) |
| A-Z3-1600 | 3.02(1) | 13.4(2) | 4.0(2) | 2.39 | β-Sialon ($Si_3Al_3O_3N_5$), AlN Polytype ($Si_3Al_6N_{12}O_2$) |

Compared with the commercially available β-Sialon (Syalon101), sample B-Z3-1500 exhibited an improved Vickers hardness (15.12 GPa vs. 14.71 GPa), with a comparable fracture toughness (7.4 $MPa \cdot m^{1/2}$ (B-Z3-1500) vs. 7.7 $MPa \cdot m^{1/2}$ (Syalon 101)). See "Syalon 101, Silicon Nitride (Si3N4) Ceramic Properties, International Syalons (Newcastle) Ltd." [Online]. Available. http://www.syalons.com/advanced-ceramic-materials/silicon-nitride-and-sialon-ceramics/syalon-101/. [Accessed. 21 Sep. 2017]. In the present study, the highest Vickers hardness of 19.24 GPa for sample A-Z1-1500 and the highest fracture toughness value of 8.65 $MPa \cdot m^{1/2}$ for sample B-Z3-1500 were both greater than the hardness and fracture toughness values of β-Sialon generally reported in the literature. See Izhevskiy, V. A. et al. *J. Eur. Ceram. Soc* 20 (2000) 2275-95, and R. S. Dobedoe, G. D. West, and M. H. Lewis, "Spark plasma sintering of ceramics: understanding temperature distribution enables more realistic comparison with conventional processing," *Adv. Appl. Ceram.*, vol. 104, no. 3, pp. 110-116, June 2005. For comparison, Table 5 provides a summarized list of processing techniques for silicon nitride-based ceramics and the mechanical properties of the resultant ceramics.

TABLE 4

Characteristics of the β-Sialon prepared by SPS with β-$Si_3N_4$ precursor.

| Sample ID | Density ($g/cm^3$) | Vickers Hardness, $Hv_{10}$ (GPa) | Fracture Toughness, $K_{Ic}$ ($MPa \cdot m^{1/2}$) | Thermal Expansion Coefficient (ppm * $K^{-1}$) | XRD Phase |
|---|---|---|---|---|---|
| B-Z1-1400* | — | — | — | — | β'-Sialon ($Si_5AlON_7$) |
| B-Z1-1500 | 3.16(1) | 15.1(6) | 7.3(7) | 1.91 | β'-Sialon ($Si_5AlON_7$), AlN Polytype ($Si_{1.84}Al_{0.16}N_{1.84}O_{1.16}$ and $Si_3Al_6N_{12}O_2$) |
| B-Z1-1600 | 3.09(1) | 14.4(5) | 6.7(8) | 2.07 | β'-Sialon ($Si_5AlON_7$), AlN Polytype ($Si_3Al_6N_{12}O_2$) |
| B-Z1-1700 | 2.99(2) | 14.4(2) | 4.4(4) | 2.9 | β'-Sialon ($Si_5AlON_7$), AlN Polytype ($Si_{1.84}Al_{0.16}N_{1.84}O_{1.16}$), Quartz Low ($SiO_2$) |
| B-Z2-1400* | — | — | — | — | β-Sialon ($Si_4Al_2O_2N_6$), AlN Polytype ($Si_3Al_6N_{12}O_2$) |
| B-Z2-1500 | 3.18(1) | 14.2(2) | 5.1(5) | 1.23 | β-Sialon ($Si_4Al_2O_2N_6$), AlN Polytype ($Si_3Al_6N_{12}O_2$) |
| B-Z2-1600 | 3.04(1) | 13.9(4) | 6.5(9) | 2.24 | β-Sialon ($Si_4Al_2O_2N_6$), AlN Polytype ($Si_3Al_6N_{12}O_2$) |
| B-Z2-1700 | 3.05(1) | 13.9(4) | 4.5(6) | 2.13 | β-Sialon ($Si_4Al_2O_2N_6$), AlN Polytype ($Si_3Al_6N_{12}O_2$) |
| B-Z3-1400* | — | — | — | — | |
| B-Z3-1500 | 3.25(1) | 14.0(2) | 8.9(9) | 2.39 | β'-Sialon ($Si_3Al_3O_3N_5$), AlN Polytype ($Si_3Al_6N_{12}O_2$) |

TABLE 4-continued

Characteristics of the β-Sialon prepared by SPS with β-$Si_3N_4$ precursor.

| Sample ID | Density (g/cm³) | Vickers Hardness, $Hv_{10}$ (GPa) | Fracture Toughness, $K_{Ic}$ (MPa·m$^{1/2}$) | Thermal Expansion Coefficient (ppm * K$^{-1}$) | XRD Phase |
|---|---|---|---|---|---|
| B-Z3-1600 | 3.14(1) | 13.7(2) | 7.1(9) | 2.44 | β'-Sialon ($Si_3Al_3O_3N_5$), AlN Polytype ($Si_3Al_6N_{12}O_2$) |
| B-Z3-1700 | 3.05(1) | 13.9(3) | 4.3(5) | 1.45 | β'-Sialon ($Si_3Al_3O_3N_5$), AlN Polytype ($Si_3Al_6N_{12}O_2$) |

*Synthesis at the evaluated temperature resulted in mostly unreacted starting materials and a product with a low density.

TABLE 5

Silicon nitride ($Si_3N_4$)-based ceramics properties.

| Sr. # | Technique & Process details Temp, holding time, etc. | Mechanical Properties $H_{V10}$ (GPa) | $K_{Ic}$ (MPa·m$^{1/2}$) | Density | Beta/Sialon Phase(s) | Reference |
|---|---|---|---|---|---|---|
| α-$Si_3N_4$ | SPS/HP | <20 | ~3 | — | α-$Si_3N_4$ | (a)-(c) |
| β-$Si_3N_4$ | SPS/HP | <16 | <7 | — | β-$Si_3N_4$ | (a), (b) |
| Ca-α-SiAlON | HP at 1700/1750° C., 20 MPa for 1 h | 18.2 | 5.6 | 3.21 | α'-92% | (d) |
| Mg/Ca-α-SiAlON | HP at 1700/1750° C., 20 MPa for 1 h | 20.5 | 5.6 | 3.22 | α'-84% | (d) |
| Nd-α'-SiAlON | Firing at 1950° C. for 1.5 h | 21.7 | 6.3 | — | Only α'-SiAlON | (e) |
| Yb-α'-SiAlON | Firing at 1650° C. for 12 h | 21.4 | 5.1 | — | Only α'-SiAlON | (e) |
| $Yb_2O_3$-SiAlON | GPS at 1900-1990° C., 100 bar for 2 h | 18.6 | 4.5 | 3.24 | 45α:55β-SiAlON (Vol %) | (f) |
| (Yb-Sm-Ca)-SiAlON-TiN | Cold IP at 300 MPa for pallet, GPS at 1890° C., 2.2 MPa for 1.5 h | 16.48 | 7.0 | — | 19α:81β-SiAlON | (g) |
| β-SiAlON + 10 wt % cBN 1 | SPS at 1550° C., 50 MPa for 5 min | 15.4 | 6.8 | 90% (relative) | only β-SiAlON | (h) |
| Y-α-SiAlON + 10 wt % cBN 2 | SPS at 1625° C., 50 MPa for 5 min | 15.9 | 7.8 | 3.28 | — | (i) |
| β-SiAlON (Syalon 101) | — | 14.7 ($H_{V50}$) | 7.7 | 3.24 | mainly β-SiAlON 3 | (j) |
| α/β-SiAlON (Syalon 050) | — | 19.8 ($H_{V50}$) | 6.5 | 3.23 | mainly β-SiAlON 4 | (k) |
| β-SiAlON (a-$Si_3N_4$ precursor) 5 | SPS at 1500° C., 50 MPa for 30 min | 19.2 | 4.2 | 2.93 | β-SiAlON | present work |
| β-SiAlON (β-$Si_3N_4$ precursor) | SPS at 1500° C., 50 MPa for 30 min | 14.0 | 8.9 | 3.25 | β-SiAlON | present work |

Table References: See
(a) T. Ekstrom and M. Nygren, "SiAlON Ceramics," J. Am. Ceram. Soc., vol. 75, no. 2, pp. 259-276, February 1992;
(b) F. L. Riley, "Silicon Nitride: Bulk Properties," Concise Encycl. Semicond. Mater. Relat. Technol., pp. 458-461, January 1992;
(c) M. Khajelakzay, S. R. Bakhshi, G. H. Borhani, and M. Ramazani, "Synthesis and spark plasma sintering of the α-$Si_3N_4$ nanopowder," Ceram. Int., vol. 42, no. 13, pp. 14867-14872, October 2016;
(d) P. Wang, C. Zhang, W. Sun, and D. Yan, "Formation behavior of multi-cation α-sialons containing calcium and magnesium," Mater. Lett., 1999;
(e) I. Chen and A. Rosenflanz, "A tough SiAlON ceramic based on α-$Si_3N_4$ with a whisker-like microstructure," Nature, 1997;
(f) A. Celik, I. Lazoglu, A. Kara, and F. Kara, "Wear on SiAlON ceramic tools in drilling of aerospace grade CFRP composites," Wear, vol. 338-339, pp. 11-21, September 2015;
(g) N. Calis Acikbas and O. Demir, "The effect of cation type, intergranular phase amount and cation mole ratios on z value and intergranular phase crystallization of SiAlON ceramics," Ceram. Int., vol. 39, no. 3, pp. 3249-3259, April 2013;
(h) F. Ye, Z. Hou, H. Zhang, L. Liu, and Y. Zhou, "Spark plasma sintering of cBN/β-SiAlON composites," Mater. Sci. Eng. A, vol. 527, no. 18-19, pp. 4723-4726, July 2010;
(i) C. Garrett, I. Sigalas, M. Herrmann, E. J. Olivier, and J. H. O'Connell, "cBN reinforced Y-α-SiAlON composites," J. Eur. Ceram. Soc., vol. 33, no. 11, pp. 2191-2198, October 2013;
(j) "Syalon 101, Silicon Nitride Ceramic." [Online]. Available: https://www.syalons.com/materials/silicon-nitride-sialon/syalon-101/. [Accessed: 12 Sep. 2018]; and
(k) "Syalon 050, Si3N4, Ceramic Alloy." [Online]. Available: https://www.syalons.com/materials/silicon-nitride-sialon/syalon-050/. [Accessed: 12 Sep. 2018].

EXAMPLE 4

Results and Discussion—Microstructure of SPSed Samples

FIGS. 7A-7I show the fracture-surface FESEM micrographs of the β-Sialon samples synthesized from nanosized amorphous $Si_3N_4$ at synthesis temperatures of 1400, 1500, and 1600° C. The fracture-surface FESEM images of the samples synthesized at 1600° C show fewer voids than the samples synthesized at 1400° C., which indicates that better densification was achieved at higher temperatures. This observation is also in accordance with the density measurement results reported in Table 3. Higher synthesis temperatures promoted the formation of larger grains compared with those of samples prepared at lower synthesis temperatures. The formation of larger grains eventually led to a decrease in the Vickers hardness; however, the presence of elongated rod-like grains favored a slight increase in the fracture toughness.

FIGS. 8A-8I show the FESEM micrographs of the β-sialon samples synthesized from microsized β-$Si_3N_4$ at synthesis temperatures of 1500, 1600, and 1700° C. At higher synthesis temperatures, the elongated (rod-like) morphology of β-Sialon was more evident. In comparison with the amorphous series, samples synthesized using microsized β-$Si_3N_4$ exhibited less porosity, with all of the samples having density values greater than 3.0 g/$cm^3$. This difference is attributed to the smaller particle size as well as the non-crystalline nature of amorphous $Si_3N_4$. Compared with the case of β-$Si_3N_4$ acting as crystal seeds to promote the formation of clear grains of β-Sialon, the samples synthesized using amorphous $Si_3N_4$ showed clear grains at higher synthesis temperatures. See K. Hirao, T. Nagaoka, M. E. Brito, and S. Kanzaki, "Microstructure Control of Silicon Nitride by Seeding with Rodlike beta-Silicon Nitride Particles," *J. Am. Ceram. Soc.*, vol. 77, no. 7, pp. 1857-1862, July 1994; and B. A. Ahmed, A. S. Hakeem, and T. Laoui, "Effect of nano-size oxy-nitride starting precursors on spark plasma sintering of calcium sialons along the alpha/(alpha+beta) phase boundary," *Ceram. Int.*, November 2018. The change in the Sialons' properties reflected in Tables 3, 4, and 5 are attributed to the prominent change in the morphology due to the starting mixture and synthesis at various temperatures.

In summary, micro- and nano-sized $Si_3N_4$ powder precursors have been consolidated using spark plasma sintering within a temperature range of 1400-1700° C. to synthesize β-SIALONs with the general formula $Si_{6-z}Al_zO_zN_{8-z}$, where the value of Z was systematically changed from 1 to 3. It has been observed that the combination of micro-sized beta-$Si_3N_4$ and other nano-sized additives did not have a significant effect on the synthesis kinetics and instead had a reasonable impact on the mechanical properties such as hardness and fracture toughness of the resultant β-SIALONs, at higher synthesis temperatures. However, nanosized $Si_3N_4$ accelerated the reaction kinetics and facilitated the low temperature synthesis of β-Sialon around 1500° C. with a noticeably higher Vickers hardness value of 19.24 GPa and fracture toughness of 4.31 MPa·$m^{1/2}$ as compared to micro-sized $Si_3N_4$. Therefore, the synthesis of β-Sialon samples (at 1500° C.) with a lower Z value resulted in well-densified samples with improved mechanical properties. The studied material is an ideal candidate for use in wear and light emitting diode applications.

The phase formation behaviour of β-Sialon with the general formula $Si_{6-z}Al_zO_zN_{8-z}$ was studied comprehensively for Z values from 1 to 3 and at synthesis temperatures from 1400 to 1700° C. The samples were prepared from nanosized amorphous $Si_3N_4$ and microsized β-$Si_3N_4$ precursors using spark plasma sintering (SPS) as the consolidation technique. Compared with the microsized β-$Si_3N_4$ precursor, the nanosized amorphous $Si_3N_4$ precursor accelerated the reaction kinetics, promoting the formation of a dense β-Sialon sample at a lower synthesis temperature of 1400° C. Field-emission scanning electron microscopy (FESEM) was used for microstructural analysis. The formation of intermediate phases was examined using high-temperature X-ray diffraction (XRD) analysis of starting powder mixtures at various temperatures. The β-Sialon phase in the sample synthesized from nanosized amorphous $Si_3N_4$ at 1500° C. and with Z=1 exhibited the highest Vickers hardness ($HV_{10}$) value among the prepared samples (19.2 GPa). However, the highest fracture toughness for the typical sample synthesized from nanosized amorphous $Si_3N_4$ was 4.73 MPa·$m^{1/2}$; the highest fracture toughness of 8.65 MPa·$m^{1/2}$ was measured for the sample prepared from a mixture of microsized β-$Si_3N_4$ and nanosized $Si_3N_4$ powders.

The invention claimed is:

1. A method of making a β-SiAlON-comprising composite, comprising:
   mixing nanoparticles of AlN, $Al_2O_3$, and $SiO_2$ with particles of $Si_3N_4$ having an average diameter in a range of 15 nm-60 μm to form a powder mixture, wherein the $Si_3N_4$ is present in the powder mixture at a weight percentage of 40-85 wt %, relative to a total weight of the powder mixture; and
   spark plasma sintering the powder mixture at a temperature of 1450-1600° C. and a pressure of 40-60 MPa to form the β-SiAlON,
   wherein the β-SiAlON-comprising composite comprises a β-SiAlON phase and an AlN polytype phase having a formula which is at least one selected from the group consisting of $Si_{1.62}Al_{0.38}N_{1.62}O_{1.38}$, $Si_{1.84}Al_{0.16}N_{1.84}O_{1.16}$ and $Si_3Al_6N_{12}O_2$.

2. The method of claim 1, wherein the powder mixture is ultrasonicated in an organic solvent and dried before the spark plasma sintering.

3. The method of claim 1, wherein the spark plasma sintering is at a temperature in a range of 1480-1520° C.

4. The method of claim 1, wherein the spark plasma sintering uses a heating rate in a range of 80-120° C./min.

5. The method of claim 1, wherein the powder mixture is spark plasma sintered for a time in a range of 15-45 min.

6. The method of claim 1, wherein the β-SiAlON-comprising composite is substantially free of Ca.

7. The method of claim 6, wherein the β-SiAlON-comprising composite consists essentially of Si, Al, O, and N.

8. The method of claim 1, wherein the $SiO_2$ nanoparticles have an average diameter in a range of 10-30 nm.

9. The method of claim 1, wherein the β-SiAlON-comprising composite has a thermal expansion coefficient in a range of 2.20-2.45 ppm/K.

10. The method of claim 1, wherein the particles of $Si_3N_4$ are nanoparticles of amorphous $Si_3N_4$ having an average diameter in a range of 15-100 nm, wherein the β-SiAlON-comprising composite has a mean grain size of 100 to 1,000 nm.

11. The method of claim 10, wherein the particles of $Si_3N_4$ are nanoparticles of amorphous $Si_3N_4$ having an average diameter in a range of 20-40 nm and are present in the powder mixture at a weight percentage of 65-85 wt %, relative to a total weight of the powder mixture.

12. The method of claim 10, wherein the β-SiAlON phase has the formula $Si_5AlON_7$.

13. The method of claim 10, wherein the β-SiAlON-comprising composite has a Vickers Hardness ($HV_{10}$) in a range of 18-25 GPa, and a density in a range of 2.80-2.95 $g/cm^3$.

14. The method of claim 10, wherein the AlN polytype has a formula which is at least one selected from the group consisting of $Si_{1.62}Al_{0.38}N_{1.62}O_{1.38}$ and $Si_{1.84}Al_{0.16}N_{1.84}O_{1.16}$.

15. The method of claim 10, wherein the β-SiAlON-comprising composite has a mean grain size of 200 to 600 nm.

16. The method of claim 1, wherein the particles of $Si_3N_4$ are microparticles of β-$Si_3N_4$ having an average diameter in a range of 25-55 μm, wherein the β-SiAlON-comprising composite has a mean grain size of 1,000 to 10,000 nm.

17. The method of claim 16, wherein the particles of $Si_3N_4$ are present in the powder mixture at a weight percentage of 40-65 wt %, relative to a total weight of the powder mixture.

18. The method of claim 16, wherein the β-SiAlON phase has the formula $Si_3Al_3O_3N_5$.

19. The method of claim 16, wherein the β-SiAlON-comprising composite has a fracture toughness in a range of 7.0-10.0 $MPa·m^{1/2}$ and a density in a range of 3.20-3.30 $g/cm^3$.

20. The method of claim 16, wherein the AlN polytype has a formula $Si_3Al_6N_{12}O_2$.

* * * * *